United States Patent
Grinberg et al.

(10) Patent No.: US 9,910,826 B2
(45) Date of Patent: Mar. 6, 2018

(54) SIMD IMPLEMENTATION OF STENCIL CODES

(71) Applicant: International Business Machines Corporation, Armonk, NY (US)

(72) Inventors: Leopold Grinberg, Belmont, MA (US); Karen A. Magerlein, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 181 days.

(21) Appl. No.: 14/670,684

(22) Filed: Mar. 27, 2015

(65) Prior Publication Data
US 2016/0283441 A1 Sep. 29, 2016

(51) Int. Cl.
G06F 17/16 (2006.01)
G06F 15/80 (2006.01)
G06F 9/30 (2006.01)

(52) U.S. Cl.
CPC ............ *G06F 17/16* (2013.01); *G06F 9/3001* (2013.01); *G06F 9/30036* (2013.01); *G06F 15/8007* (2013.01); *G06F 15/8053* (2013.01)

(58) Field of Classification Search
CPC .................................................. G06F 9/30036
See application file for complete search history.

(56) References Cited

U.S. PATENT DOCUMENTS

| | | | |
|---|---|---|---|
| 4,937,776 A | 6/1990 | Myers et al. | |
| 5,274,832 A | 12/1993 | Khan | |
| 5,864,703 A * | 1/1999 | van Hook | G06F 9/30014 708/490 |
| 7,757,222 B2 | 7/2010 | Liao et al. | |
| 7,978,194 B2 | 7/2011 | Seiler et al. | |
| 8,413,126 B2 | 4/2013 | Beyer | |
| 2012/0320051 A1 | 12/2012 | State et al. | |

OTHER PUBLICATIONS

Jaeger, Julien et al, "Automatic Efficient Data Layout for Multithreaded Stencil Codes on CPUs and GPUs", 2012, IEEE, pp. 1-10.*

(Continued)

*Primary Examiner* — Matthew Sandifer
(74) *Attorney, Agent, or Firm* — David Zwick

(57) ABSTRACT

Implementing a 1D stencil code via SIMD instructions on a computer with vector registers having N processing elements (PEs), among them a set of coefficient vector registers, a set of at most N data vector registers, and a set of result vector registers. The M stencil coefficients are loaded in a particular pattern into M+N−1 coefficient vector registers. Successive sets of N consecutive data values are received, and each data value of a set is loaded into all PEs of a data vector register of the set of data vector registers. The result vector registers accumulate sums of products of consecutive coefficient vector registers with corresponding data vector registers. The contents of any result vector register containing a sum of all coefficient vector register-data vector register products is output, and the result vector register is reused for accumulating.

18 Claims, 15 Drawing Sheets

(56) References Cited

OTHER PUBLICATIONS

Dursun et al., "In-Core Optimization of High-order Stencil Computations," Proceedings of the International Conference on Parallel and Distributed Processing Techniques and Applications, PDPTA 2009, Las Vegas, Nevada, USA, Jul. 13-17, 2009, pp. 1-7.

Henretty et al., "Data Layout Transformation for Stencil Computations on Short-Vector SIMD Architectures," CC '11/ETAPS '11, Proceedings of the 20th International Conference on Compiler Construction: part of the joint European conferences on theory and practice of software, 2011, pp. 225-245.

Datta et al., "Optimization and Performance Modeling of Stencil Computations on Modern Microprocessors," SIAM Review, vol. 51, Issue 1, Feb. 2009, pp. 1-31.

\* cited by examiner

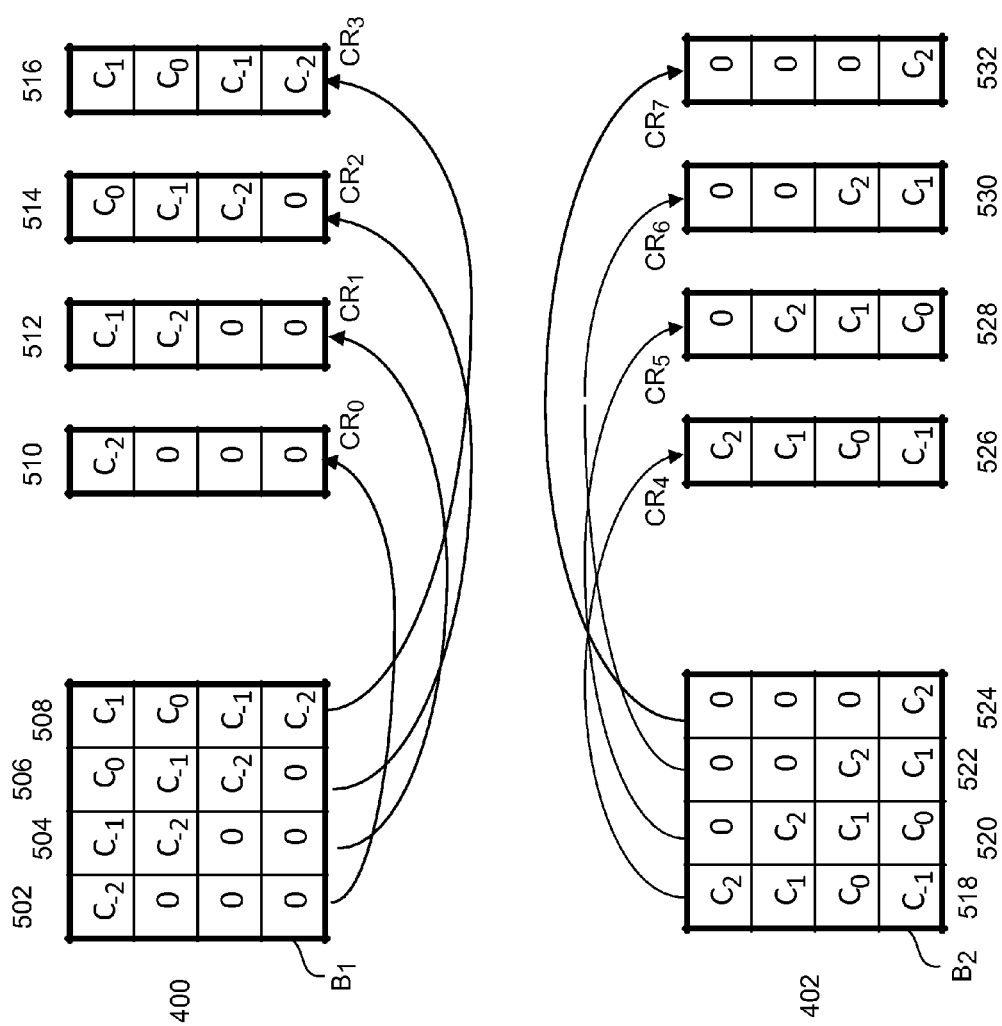

SIMD IMPLEMENTATION OF STENCIL CODES

BACKGROUND

The present invention relates generally to the field of matrix calculations on a computer, and more particularly to performing matrix calculations using Single Instruction Multiple Data (SIMD) operations.

SUMMARY

Embodiments of the present invention disclose a computer-implemented method, computer program product, and system for implementing a 1D stencil code via SIMD instructions on a computer that includes a plurality of vector registers, each having a number N of processing elements (PEs), the plurality of vector registers including a set of vector registers used to store stencil coefficients, a set of vector registers used to store data values, and a set of vector registers used to store results. A number M of ordered stencil coefficients is received. Stencil coefficients are loaded into M+N−1 consecutive coefficient vector registers, such that the first PEs of the first M coefficient vector registers contain the M stencil coefficients in order, and the remaining N−1 PEs of the first coefficient vector register and the first PEs of the N−1 coefficient vector registers following the first M coefficient vector registers contain zeros. Subsequent PEs of the M+N−2 coefficient vector registers following the first coefficient vector register contain the value stored in the previous PE of the previous coefficient vector register. At least M+N−1 data values are received. For consecutive sets of N consecutive data values, each data value of the set is loaded into all PEs of a data vector register. In a result vector register, a sum of products of consecutive coefficient vector registers with data vector registers containing the consecutive data values is accumulated. The contents of each result vector register containing a sum of the products of all the coefficient vector registers with a data vector register is output, and the result vector register is reused for accumulating.

BRIEF DESCRIPTION OF THE DRAWINGS

FIG. 5 illustrates storing blocks present in the matrix of FIG. 4A in vector registers, in accordance with an embodiment of the present invention.

FIGS. 8C, 8E, and 8F are another flowchart depicting operational steps of a stencil code matrix-vector multiplication in accordance with an embodiment of the present invention.

DETAILED DESCRIPTION

Figure 1A:
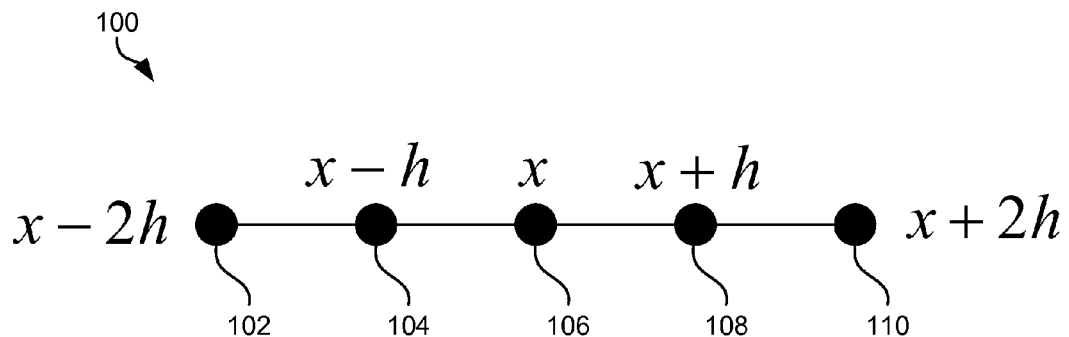
FIG. 1A is an illustration of a 1D stencil, in accordance with an embodiment of the present invention.

Embodiments of the present invention are directed to improving the speed and efficiency of stencil codes in computing environments that support SIMD instructions via vector registers.

A grid is a set of points, typically representing physical locations or times, at which a function is sampled. Typically, a grid is uniformly spaced, so that in one dimension (1D) the grid points can be written as $x_i = a + i\Delta x$, where $x_i$ is the ith grid point, i is the ordinal integer number of the grid point, a is the origin grid point, and $\Delta x$ is the spacing, or interval, between grid points. In two dimensions (2D), a rectangular grid of points may be used. In this case, the grid points may have the form $(x_i, y_j) = (a + i\Delta x, b + j\Delta y)$, where $y_j$ is defined similarly to $x_i$, above. Higher dimensional grids may be defined in an analogous fashion.

In many scientific applications that model physical systems, such as seismic imaging, operations may be performed over each grid point and its neighboring points in a fixed pattern, called a stencil, to compute output values. In a stencil operation, the value computed at a given grid point of a stencil is a fixed linear combination of the values at the grid points of the stencil. The constants in this fixed linear combination are referred to as stencil coefficients. A stencil code consists of a sequence of stencil operations, typically with the same stencil and stencil coefficients. For example, in a 1D stencil code, after a stencil operation has been performed at one grid point, the stencil is typically shifted to the next grid point and the operation is performed again, and so on, until all grid points of interest have been processed. Typically, stencil operations are performed only at grid points for which the entire stencil lies on the grid. In this case, the number of output values will be fewer than the number of input values by one less than the number of stencil coefficients.

For example, finite difference schemes for computing approximate derivatives in 1D at uniformly spaced points may be implemented as stencil codes. Typically, the stencil coefficients in this case are symmetric: $C_{-j} = C_j, j = 1, \ldots, K$. In this case, a typical stencil operation that computes a derivative $f^{(n)}$ at grid point $x_i = a + i\Delta x$ may be formulated as:

$$f_i^{(n)} = C_K f_{i-K} + C_{K-1} f_{i-K+1} + \ldots + C_0 f_i + \ldots + C_K f_{i+K}$$

where $f_{i-K}, \ldots, f_{i+K}$ represent values of a function $f$ at grid points $x_{i-K}, \ldots, x_{i+K}$.

In general, a stencil operation involving M stencil coefficients $C_0, \ldots, C_{M-1}$ applied to a sequence of data values $f_i, \ldots, f_{i+M-1}$ may be expressed as $$C_0 f_i + C_1 f_{i+1} + \ldots + C_M f_{i+M-1}.$$

If the grid has two or more dimensions, a multidimensional stencil may be employed. Examples of multidimensional stencils include a five-point stencil commonly used to discretize Laplace's equation in 2D, or a 25-point 3D stencil used in seismic imaging. Multidimensional stencils may be implemented as combinations of 1D stencils.

The application of a 1D stencil code may be viewed as matrix-vector multiplication Au=b, in which each row in matrix A corresponds to a single stencil operation, with the stencil coefficients appearing as entries in the row, and other row entries being zero. Each entry $b_i$ in the result, or right-hand side (RHS), vector b corresponds to an output value, obtained by performing the stencil operation indicated by row i of A to a sequence of data values that appear as entries in u. In typical examples, the matrix A corresponding to a 1D stencil code is upper triangular, banded, and has constant diagonals. It will be appreciated by those skilled in the art that representing a stencil code as a matrix-vector multiplication is merely a conceptual aid for logically organizing the work performed in applying a stencil code to a sequence of data values; it does not imply any particular physical structure of the data. In particular, data in memory need not be contiguous or aligned, may have any stride, and may be read in any order.

Single Instruction Multiple Data (SIMD) refers to a style of parallel computing. SIMD instructions provide a capability to perform a single operation on multiple data values simultaneously. Computers that support SIMD instructions typically have multiple vector registers, each containing two or more processing elements (PEs), which concurrently perform the same operation on the individual data values stored in the PEs. For example, one SIMD instruction might multiply the contents of two vector registers by simultaneously multiplying the individual data values in corresponding PEs with each other.

Embodiments of the present invention will now be described in detail with reference to the accompanying drawings.

FIG. 1A is an illustration of a 1D stencil 100, in accordance with an embodiment of the present invention. 1D stencil 100 is a 5-point stencil that includes grid points x−2h 102 to x+2h 110, which are uniformly spaced, with spacing h. The stencil is centered at grid point x 106. Grid points x−2h 102 to x+2h 110 are associated with stencil coefficients $C_{-2}, C_{-1}, C_0, C_1, C_2$, respectively (not shown). In conjunction with stencil coefficients $C_{-2}, C_{-1}, C_0, C_1, C_2$, 1D stencil 100 may be used to perform a stencil operation. For example, the stencil operation may compute a new value at center point x 106 according to the following formula:

$$f(x)^{new} = C_{-2}f(x-2h) + C_{-1}f(x-h) + C_0 f(x) + C_1 f(x+h) + C_2 f(x+2h)$$

where $f(x-2h)$, $f(x-h)$, $f(x)$, $f(x+h)$ and $f(x+2h)$ represent data values associated with the grid points x−2h 102, x−h 104, x 106, x+h 108, and x+2h 110, respectively. The stencil may then be shifted, i.e., re-centered, on an adjacent grid point such as x+h 108, and the stencil operation is repeated. As mentioned above, the repeated execution of a stencil operation and shift of the stencil, with a given stencil and a fixed set of stencil coefficients, may be referred to as a stencil code.

Figure 1B:
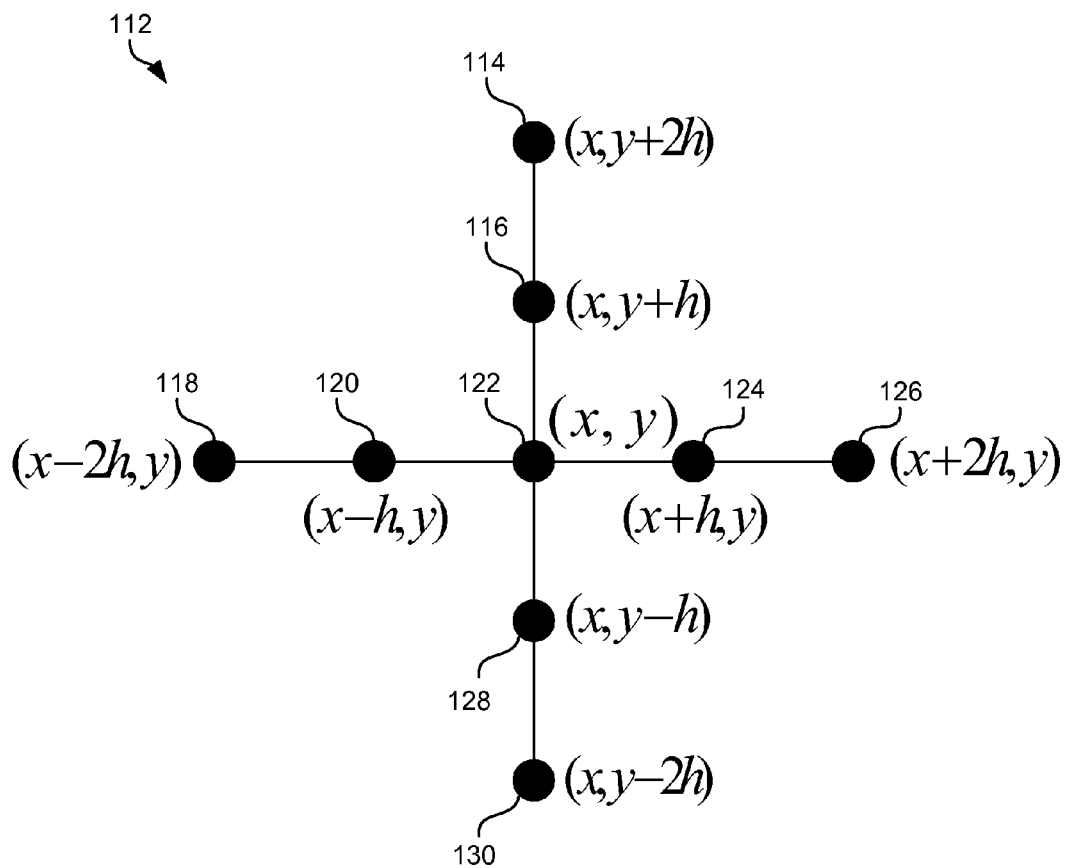
FIG. 1B is an illustration of a 2D stencil, in accordance with an embodiment of the present invention.

FIG. 1B is an illustration of a 2D stencil 112, in accordance with an embodiment of the present invention. The 2D stencil 112 is a 9-point stencil defined analogously to the 1D stencil 100 of FIG. 1A, which includes grid points (x−2Δx,y) 118 to (x+2Δx,y) 126 and (x,y−2Δy) 114 to (x,y+2Δy) 130. In this example, the spacing between grid points in the x-direction is Δx, which may differ from the spacing Δy in the y-direction. In conjunction with a set of stencil coefficients $C_{i,j}$, i,j=−2, −1,0,1,2, stencil 112 may be used to perform a 2D stencil operation. For example, the stencil operation may compute a value at center point (x,y) 122 according to the following formula:

$$f(x,y)^{new} = C_{-2,0} f(x-2\Delta x, y) + C_{-1,0} f(x-\Delta x, y) + C_{0,0} f(x,y) +$$
$$C_{1,0} f(x+\Delta x, y) + C_{2,0} f(x+2\Delta x, y) + C_{0,-2} f(x, y-2\Delta y) +$$
$$C_{0,-1} f(x, y-\Delta y) + C_{0,1} f(x, y+\Delta y) + C_{0,2} f(x, y+2\Delta y)$$

where $f(x-2\Delta x,y)$, $f(x-\Delta x,y)$, $f(x,y)$, $f(x+\Delta x,y)$, $f(x+2\Delta x,y)$, $f(x,y-2\Delta y)$, $f(x,y-\Delta y)$, $f(x,y+\Delta y)$, and $f(x,y+2\Delta)$ represent data values associated with grid points (x−2Δx,y) 118, (x−Δx,y) 120, (x,y) 122, (x+Δx,y) 124, (x+2Δx,y) 126, (x,y−2Δy) 130, (x,y−Δy) 128, (x,y+Δy) 116, and (x,y+2Δy) 114, respectively.

The stencil operation based on stencil 112 may be implemented using a combination of two 1D stencils, one in the x-direction involving grid points (x−2Δx,y) 118, (x−Δx,y) 120, (x,y) 122, (x+Δx,y) 124, and (x+2Δx,y) 126, and one in the y-direction involving grid points (x,y−2Δy) 130, (x,y−Δy) 128, (x,y) 122, (x,y+Δy) 116, and (x,y+2Δy) 114. In general, higher dimensional stencil operations may be implemented as combinations of 1D stencils.

Figure 2:
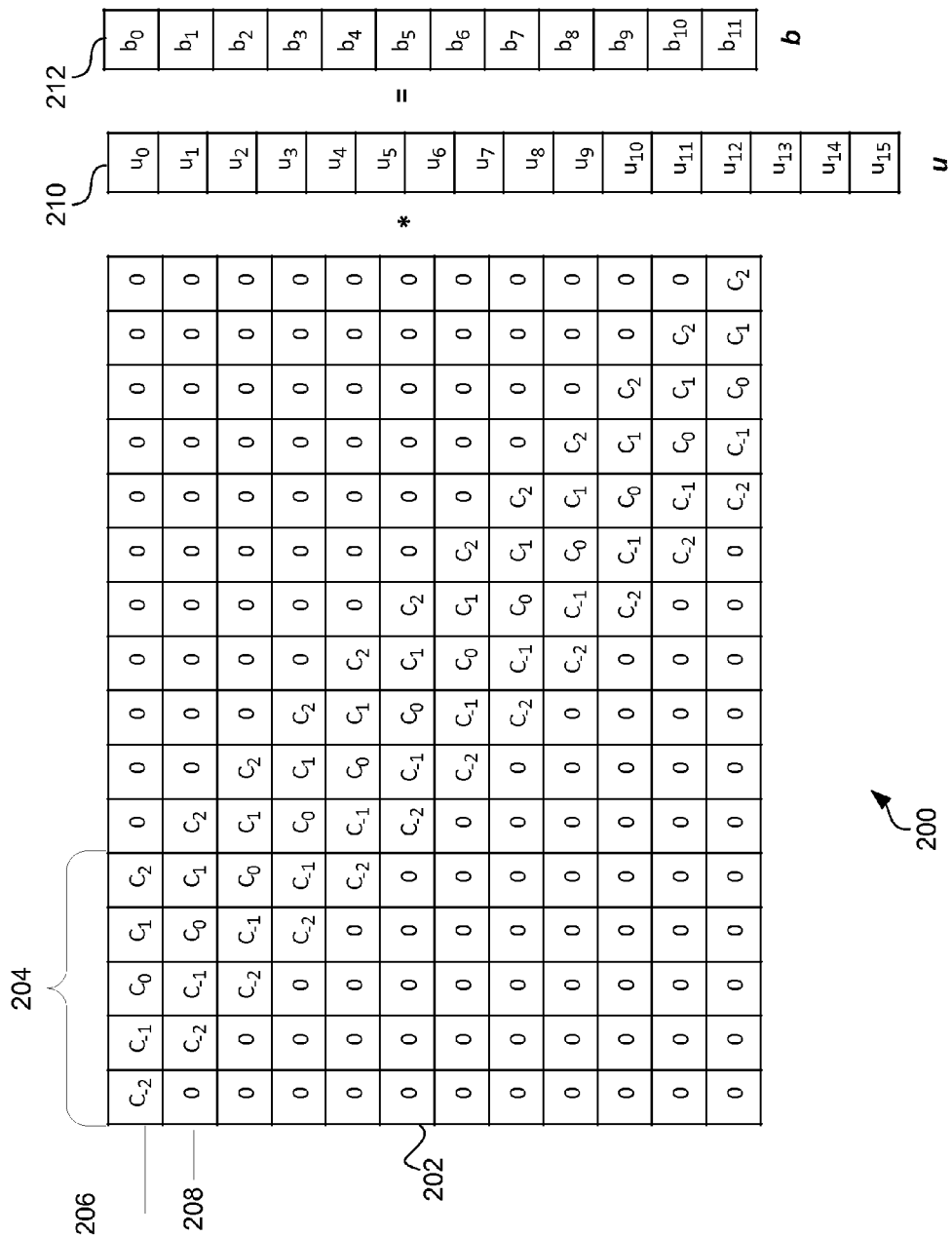
FIG. 2 illustrates a stencil code matrix-vector multiplication, in accordance with embodiments of the present invention.

As mentioned above, the application of a 1D stencil code may be represented as a matrix-vector multiplication. FIG. 2 illustrates a matrix-vector multiplication 200, which may represent an exemplary implementation of a 1D stencil code. Stencil code matrix-vector multiplication 200 includes stencil code matrix 202, data vector u 210, with entries $u_0, u_1, \ldots$, and right-hand side (RHS) vector b 212, with entries $b_0, b_1, \ldots$. The first row 206 of stencil code matrix 202 includes as entries stencil coefficients $C_{-2}, C_{-1}, C_0, C_1, C_2$ 204 in the five left-most row locations, followed by zeros in the remaining row locations. Each subsequent row of 202 contains the same stencil coefficients 204 shifted right one column location relative to the previous row, with all other entries being zero. For example, the second row 208 of stencil code matrix 202 has entries 0,$C_{-2}$, $C_{-1}$, $C_0$, $C_1$, $C_2$, followed by zeros. The RHS vector b 212 is the result of multiplying data vector u 210 by stencil code matrix 202. Each element of RHS vector b 212 is equal to the inner product of the corresponding row of stencil code matrix 202 with data vector u 210.

RHS vector b 212 of FIG. 2 represents the result of applying a stencil code with stencil coefficients $C_{-2}, C_{-1}, C_0, C_1, C_2$ 204 to successive data values $u_0, u_1, \ldots$, which appear as elements in data vector u 210. For example, referring to row 206 in stencil code matrix 202, the value $b_0$ in the first location of RHS vector b 212 equals $C_{-2}u_0 + C_{-1}u_1 + C_0 u_2 + C_1 u_3 + C_2 u_4$, according to the standard rules of matrix-vector multiplication. The data values $u_5, u_6, \ldots$, which are multiplied by zeroes in row 206, contribute nothing to $b_0$ and may be disregarded. Row 208 corresponds to applying the stencil operation after shifting the stencil to the next grid point, yielding $b_1 = C_{-2}u_1 + C_{-1}u_2 + C_0 u_3 + C_1 u_4 + C_2 u_5$.

As mentioned above, in the standard representation of a general matrix-vector product, each element of the RHS vector is an inner product of a row of the matrix with the data vector. However, in an alternative representation of matrix-vector multiplication, the outer product formulation of the matrix-vector product Au=b, rather than computing each element $b_i$ of b as the inner product of row i of matrix A with u, b is computed as a linear combination of columns of A, scaled by elements of u, according to the following equation:

$$b = u_0 A^0 + u_1 A^1 + \quad (1)$$

where $u_0, u_1, \ldots$ are the successive elements of u and $A^0, A^1, \ldots$ are the successive columns of A.

Figure 3A:
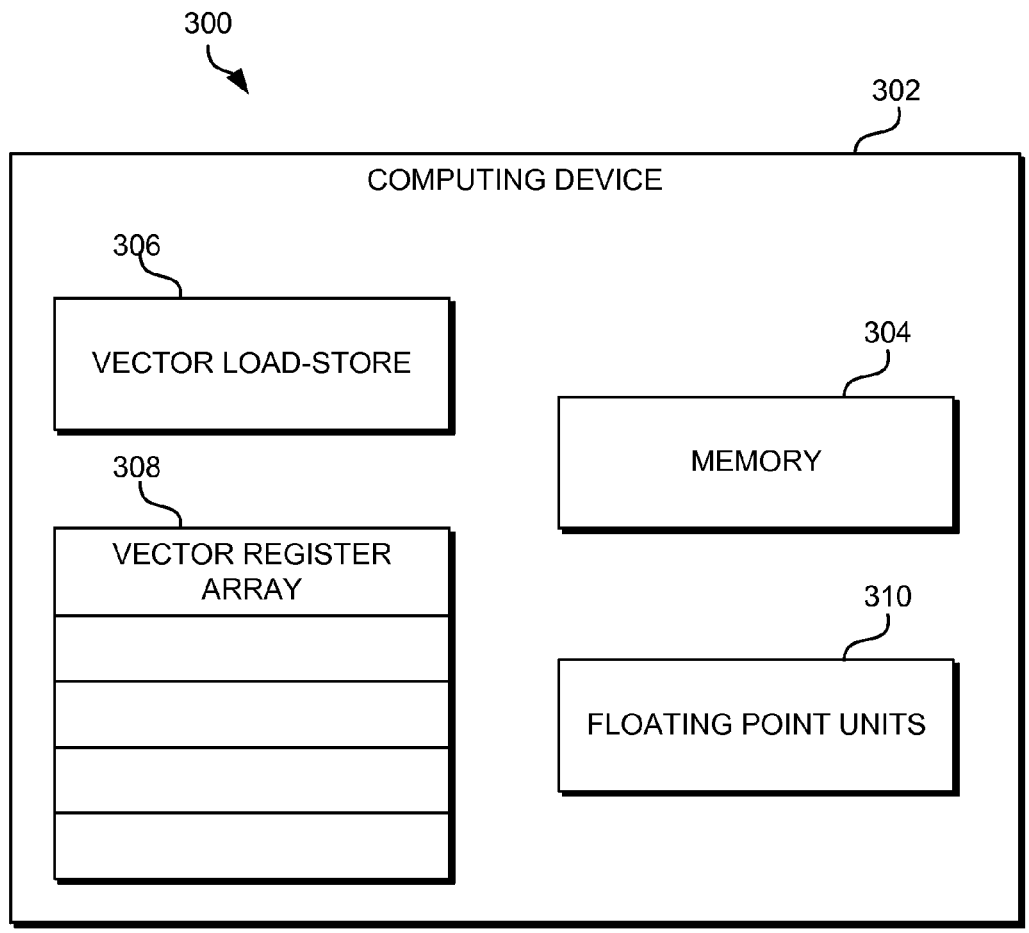
FIG. 3A shows a computing environment, in accordance with an embodiment of the present invention.

FIG. 3A is a functional block diagram of an exemplary computing environment 300 in which the present invention may be implemented. Computing environment 300 includes computing device 302, which further includes memory 304, a vector load-store unit 306, an array of two or more vector registers 308, and floating point units (FPUs) 310. Computing device 302 may be, for example, a laptop computer, tablet computer, netbook computer, personal computer (PC), or a desktop computer, in accordance with an embodiment of the invention. In general, a computing device 302 may be any programmable electronic device capable of supporting functionality as required by one or more embodiments of the invention. A computing device 302 may include internal and external hardware components as depicted and described in further detail below with reference to FIG. 9.

Figure 3B:
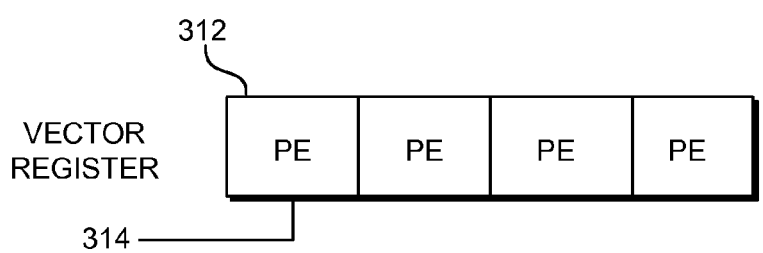
FIG. 3B is a block diagram of a vector register in the computing environment of FIG. 3A, in accordance with an embodiment of the present invention.

FIG. 3B depicts a typical vector register 312 that may be included in vector register array 308. Typically, vector register array 308 will contain a plurality of vector registers 312. A vector register 312 contains two or more processing elements (PEs) 314. In this example, the vector register 312 contains four PEs 314. Each PE 314 may typically hold a float (32 bits) or double (64 bits) value.

In an exemplary embodiment, vector register array 308, along with FPUs 310, may implement SIMD instructions. For example, vector load-store unit 306 may synchronously load data values from memory 304 into all the PEs 314 of a vector register 312. The FPUs 310 may then perform the same operation simultaneously on all the data values in the PEs 314 of the vector register 312.

In accordance with an embodiment of the present invention, a system and method efficiently performs stencil code matrix-vector multiplication 200, representing the application of a stencil code based on stencil 100, in computing environment 300, via SIMD operations that utilize vector register array 308.

As mentioned, SIMD instructions may operate simultaneously on all PEs 314 in one or more vector registers 312 in vector register array 308. In an exemplary embodiment of the invention, one SIMD instruction might load a vector register 312 by simultaneously loading its four PEs 314 with data values. A particular example, referred to as vec_splat, simultaneously loads and replicates a single value into all four PEs 314 of a vector register. Another example SIMD instruction, referred to as vec_mul, multiplies two vector registers in vector register array 308 with each other, via a simultaneous, elementwise multiplication of the contents of their four PEs. Similarly, a SIMD instruction, referred to as vec_madd, multiplies the contents of two vector registers in vector register array 308, as with vec_mul, and adds the result, elementwise, to the contents of a third vector register in vector register array 308.

Figure 4A:
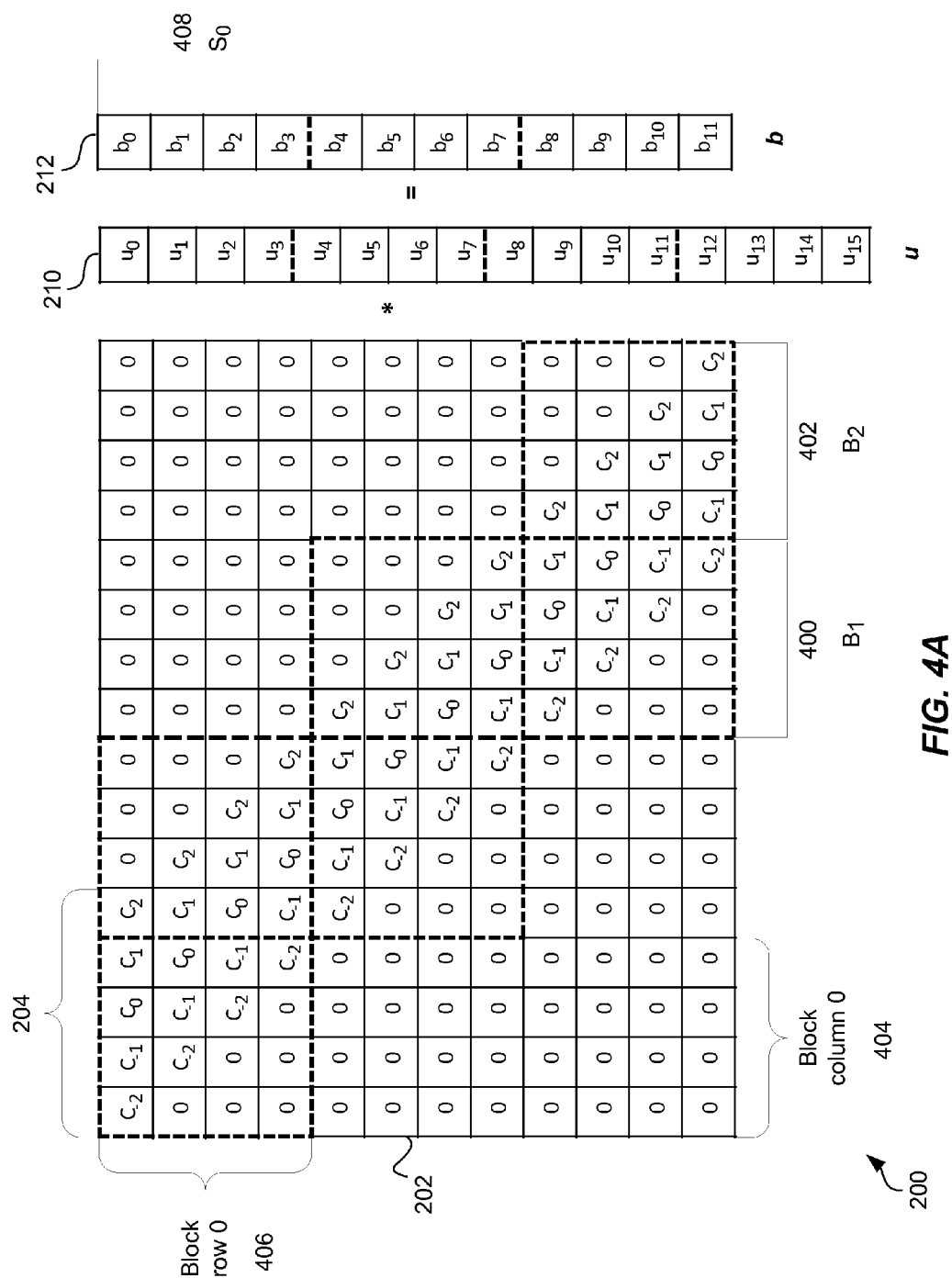
FIG. 4A illustrates a second stencil code matrix-vector multiplication, in accordance with an embodiment of the present invention.

FIG. 4A shows stencil code matrix-vector multiplication 200, as described in relation to FIG. 2, and further includes $B_1$ 400, $B_2$ 402, block column 0 404, and block row 0 406.

According to an embodiment of the invention in which vector registers 312 have four PEs 314 (see FIG. 3), stencil code matrix 202 is partitioned into blocks of size 4×4, such as $B_1$ 400 and $B_2$ 402, while data vector u 210 and RHS vector b 212 are subdivided into segments of length 4, such as $S_0$ 408. In this exemplary embodiment, stencil code matrix 202 has constant block diagonals, exhibiting copies of only two distinct, nonzero blocks $B_1$ 400 and $B_2$ 402, which are repeated in a fixed pattern on the matrix diagonal. Each successive group of four columns or four rows will be referred to as a block column or block row, respectively. For example, columns 0-3 of stencil code matrix 202 are referred to as block column 0 404; columns 4-7 constitute block column 1, and so on. Similarly, rows 0-3 of stencil code matrix 202 constitute block row 0 406, rows 4-7 constitute block row 1, and so on. Each block row corresponds to a segment of b 212. For example, block row 0 406 corresponds to segment $S_0$ 408. The intersection of any block column, for example block column 0 404, with any block row, for example block row 0 406, consists of a single 4×4 block, which is either zero or a copy of $B_1$ 400 or $B_2$ 402. In this example, the initial block column contains only one of the two distinct, nonzero blocks $B_1$ 400 and $B_2$ 402, as does the final block column, while the two intermediate block columns each contain both of the nonzero blocks.

In other embodiments, stencils may have a greater number of stencil coefficients, and vector registers in vector register array 308 (FIG. 3) may have more or fewer than four PEs 314 per vector register 312. In general, if a stencil has M stencil coefficients and there are N PEs per vector register, then the number of distinct, nonzero blocks, into which stencil code matrix 202 of FIG. 2 may be partitioned, will be [(M+N−1)/N], the smallest integer not less than (M+N−1)/N. As mentioned above, in general, number of output values will be the number of data values minus M−1. That is, stencil code matrix 202 will have M−1 fewer rows than columns.

Figure 4B:
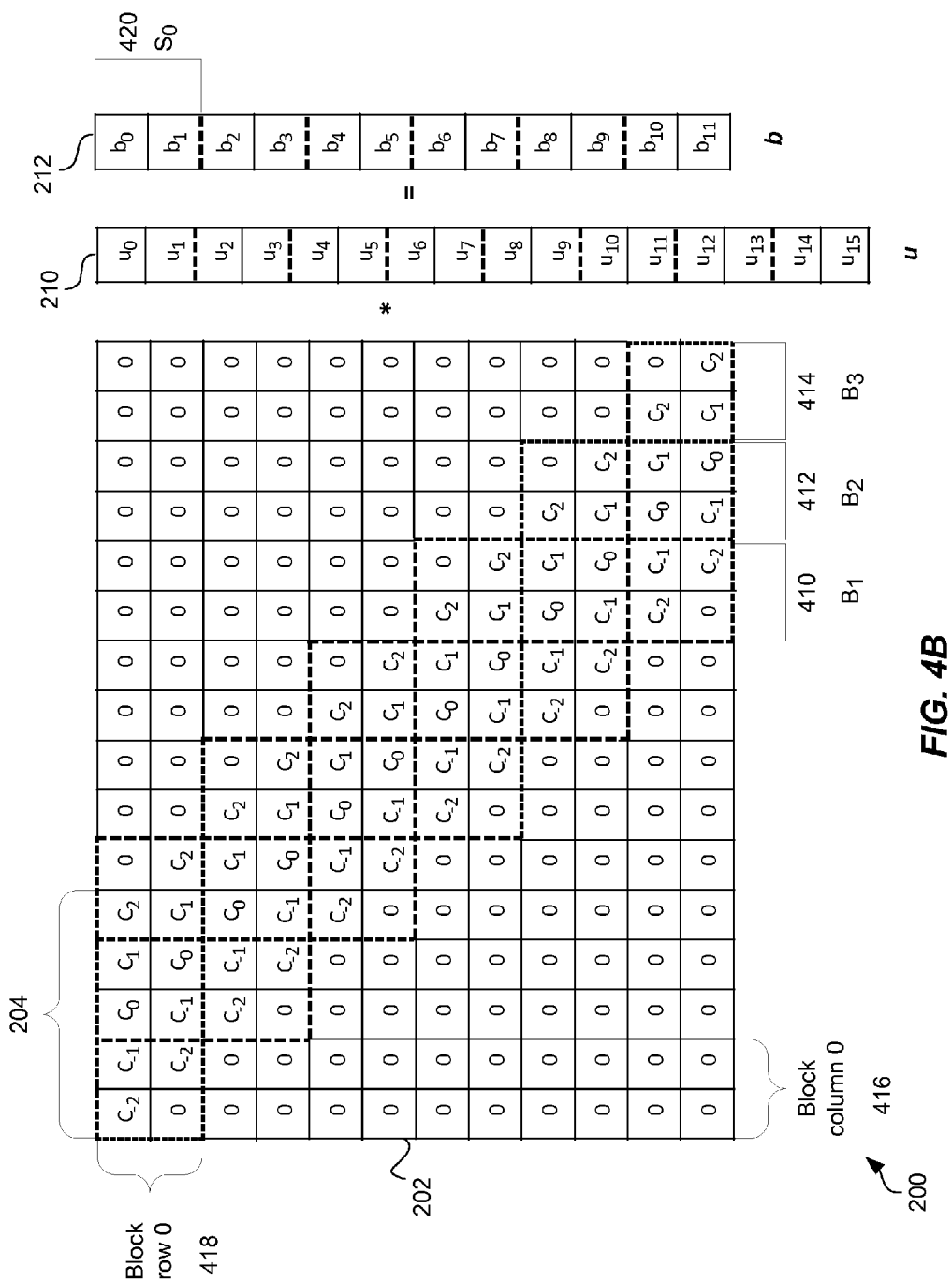
FIG. 4B illustrates a third stencil code matrix-vector multiplication, in accordance with an embodiment of the present invention.

For example, FIG. 4B depicts stencil code matrix-vector multiplication 200 (FIG. 2) in an alternative embodiment in which vector registers in vector register array 308 (FIG. 3) each have two PEs. In this case, stencil code matrix 202 is partitioned into blocks of size 2×2, of which the nonzero blocks are copies of three blocks, $B_1$ 410, $B_2$ 412, and $B_3$ 414, while data vector u 210 and RHS vector b 212 are subdivided into segments of length 2, such as $S_0$ 420. In such embodiments, stencil code matrix 202 may have several initial and final block columns, containing fewer than the full number of distinct, nonzero blocks, and there may be considerably more intermediate block columns, containing copies of all the distinct, nonzero blocks. For example, in FIG. 4B, stencil code matrix 202 has two initial and two final block columns, containing one or two nonzero blocks, and four intermediate block columns. The first block column, block column 0 416, is an initial block column with one nonzero block, which is a copy of $B_1$ 410; the next block column contains a copy of $B_2$ 412 and $B_1$ 410; the second to last block column contains a copy of $B_2$ 412 and $B_3$ 414; and the last column contains one nonzero block, a copy of $B_3$ 414. Moreover, in FIG. 4B, each block row of stencil code matrix 202, for example block row 0 418, contains three nonzero blocks, which are copies of $B_1$ 410, $B_2$ 412, or $B_3$ 414, with $B_1$ being the first nonzero block in the row and $B_3$ being the last nonzero block in the row. Nonzero block $B_2$ 412 is neither the first nor the last nonzero block in a block row.

In some embodiments of the invention, the number of rows or columns in stencil code matrix 202 may not be evenly divisible by the number of PEs 314. In this case, the partitioning of stencil code matrix 202 into blocks, as described above, may result in a partial last block row or block column, containing blocks in which one or more rows or columns, respectively, are missing. Also, some nonzero blocks may contain one or more columns of zeros.

FIG. 5 illustrates how stencil code matrix 202, as described in relation to FIG. 2, may be compactly stored in vector registers for the purpose of stencil code matrix-vector multiplication, in accordance with an exemplary embodiment. In the exemplary embodiment illustrated in FIG. 4A, stencil code matrix 202 contains only zeros and copies of two distinct, nonzero blocks $B_1$ 400 and $B_2$ 402, also shown in FIG. 5. As zero blocks do not affect matrix-vector multiplication, only nonzero blocks need be stored. As illustrated in FIG. 5, eight vector registers $CR_0$-$CR_7$ 510-516 and 526-532 are used to store stencil coefficients 204. For example, vector register $CR_4$ 526 contains the stencil coefficients $C_2$, $C_1$, $C_0$, $C_{-1}$, which appear in the first column 518 of block $B_2$ 402, in corresponding PEs of $CR_4$; and vector register $CR_5$ 528 contains zero and the stencil coefficients $C_2$, $C_1$, $C_0$, which appear in the second column 520 of block $B_2$ 402, in corresponding PEs of $CR_5$. Columns 502-508 of block $B_1$ 400 are stored in coefficient vector registers $CR_0$-$CR_3$ 510-516, for example via SIMD vector load instructions, and columns 518-524 of block $B_2$ 402 are stored in coefficient vector registers $CR_4$-$CR_7$ 526-532. Only distinct, nonzero columns of the blocks need be saved in the coefficient vector registers, and no further loading or storing of stencil coefficients need take place during the stencil code matrix-vector multiplication.

In general, if a stencil has M stencil coefficients and there are N PEs per vector register, then M+N−1 coefficient vector registers may suffice to store the distinct, nonzero columns of the nonzero blocks in stencil code matrix 202 (FIG. 2), for the purpose of stencil code matrix-vector multiplication. For example, in FIG. 4B, with five stencil coefficients and two PEs per vector register, the distinct, nonzero columns of the nonzero blocks of stencil code matrix 202 may be stored in six coefficient vector registers.

In other embodiments, in which the stencil code matrix may not exhibit the repeating block structure of stencil code matrix 202 illustrated in FIG. 4A, the stencil code matrix may be stored in vector registers, for the purpose of stencil code matrix-vector multiplication, by copying each unique, nonzero column that appears in a block row in the stencil code matrix into a separate coefficient vector register.

Figure 6:
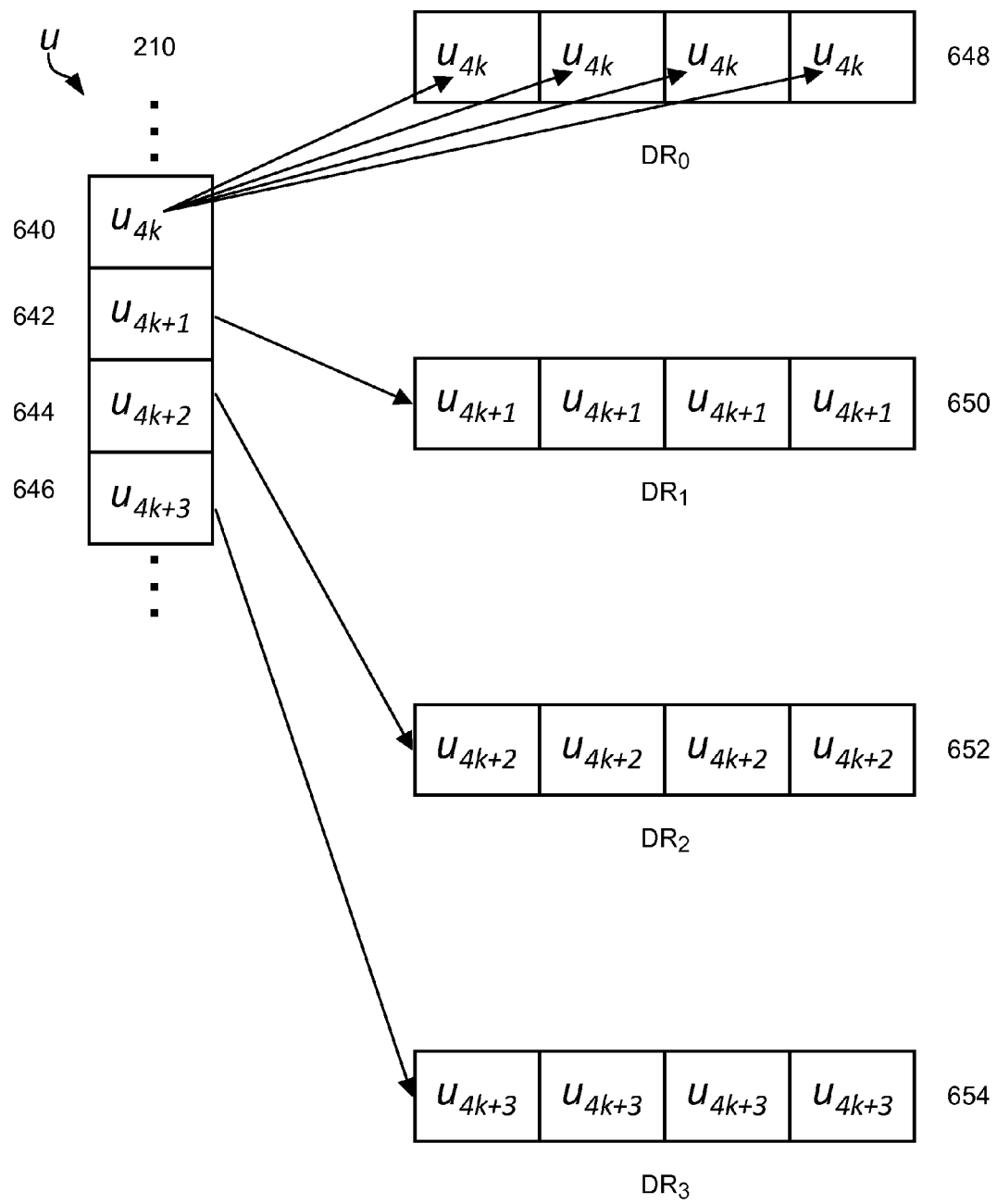
FIG. 6 illustrates copying and replicating a sequence of data values into vector registers, in accordance with an embodiment of the present invention.

FIG. 6 illustrates the manner in which a sequence of data values may be copied into a set of vector registers for the purpose of stencil code matrix-vector multiplication, in accordance with an embodiment of the invention, in which vector registers 312 each contain four PEs 314 (see FIG. 3). This may be performed to enable multiplication with stencil coefficients loaded into coefficient vector registers as described in relation to FIG. 5. The copying may be performed by SIMD instruction vec_splat, described above. For each index k=0,1, . . . , element $u_{4k}$ 640 of data vector u 210 (FIG. 2) is copied into each of the four PEs of a first data vector register $DR_0$ 648. Element $u_{4k+1}$ 642 is copied into each of the PEs of a second data vector register $DR_1$ 650. Similarly, elements $U_{4k+2}$ 644 and $U_{4k+3}$ 646 are copied into $DR_2$ 652 and $DR_3$ 654. FIG. 6 shows the result of copying the first four data values $u_0$, . . . , $u_3$, corresponding to k=0, into four data vector registers 648-654 via vec_splat.

Figure 7:
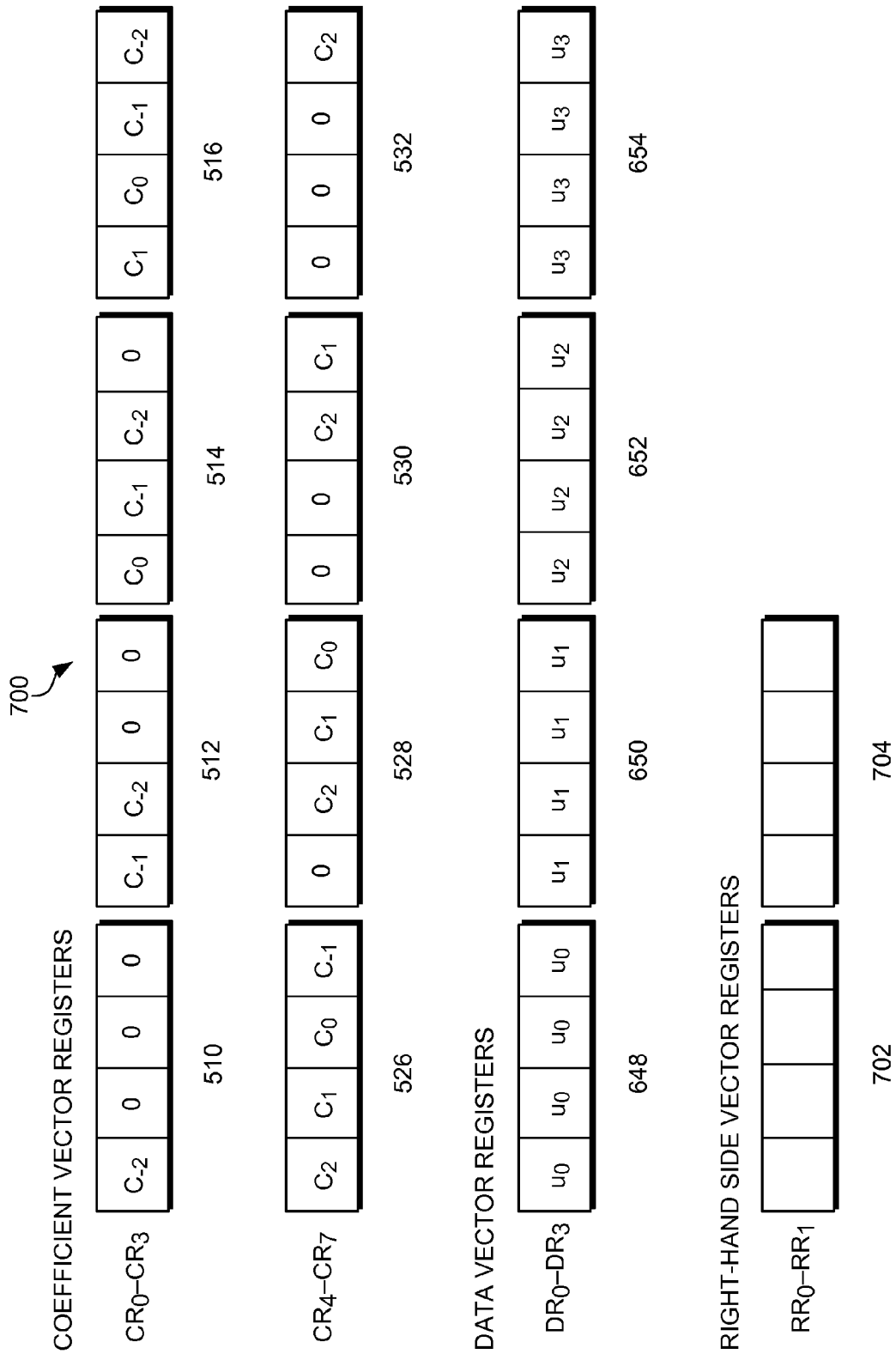
FIG. 7 illustrates coefficient vector registers, data vector registers, and right-hand side vector registers, for a stencil code matrix-vector multiplication operation, in accordance with an embodiment of the present invention.

FIG. 7 illustrates an arrangement of vector registers 700, which suffice to perform the operations of stencil code matrix-vector multiplication 200 (FIG. 2), in an exemplary embodiment of the invention. As shown in FIG. 7, stencil coefficients $C_{-2}$ to $C_2$ have been loaded into eight coefficient vector registers $CR_0$-$CR_7$ 510-516 and 526-532, according to the vector operations described in relation to FIG. 5, in which the columns of block $B_1$ 400 (FIG. 4A) are stored in coefficient vector registers $CR_0$-$CR_3$ 510-516 and the columns of block $B_2$ 402 are stored in coefficient vector registers $CR_4$-$CR_7$ 526-532. The first four data values $u_0$, $u_1$, $u_2$, $u_3$ of data vector 210 have been loaded and replicated into each PE in four data vector registers $DR_0$-$DR_3$ 648-654, according to the vector operations described in relation to FIG. 6. Two result, or right-hand side (RHS), vector registers, $RR_0$ 702 and $RR_1$ 704, may be used to accumulate RHS vector b 212 according to equation (1) above, whereby a segment of b 212, such as $S_0$ 408, may be accumulated in a single RHS vector register, such as $RR_0$ 702.

Adhering to the outer product formulation of the matrix-vector product described above in relation to equation (1), the calculation of stencil code matrix-vector multiplication 200 (FIG. 2), in an exemplary embodiment, proceeds block column-wise, starting with block column 0 404 (FIG. 4A). The sum in equation (1), restricted to the columns in a single block column, is referred to as a partial sum, while the sum, or a partial sum, restricted to the rows in a block row, is referred to as a component. Thus, in the exemplary embodiment, in which vector registers 312 have four PRs 314 (FIG. 3), a partial sum involves a single segment of four data values. For example, the partial sum corresponding to block column 0 404 involves $u_0$, $u_1$, $u_2$, $u_3$. A component of a partial sum involves four successive terms in each of a sequence of four stencil operations, and a component of the sum in (1) involves four successive stencil operations and determines a segment of b 212.

In one embodiment of the invention, the nonzero 4×4 blocks within a block column, which are copies of $B_1$ 400 and $B_2$ 402, may be processed individually, as described in more detail below. If a nonzero block is the last nonzero block in its block row, then, once it has been processed and the component of the sum for that block row has been stored as a segment of RHS vector b 212, the RHS vector register that had been used to accumulate that component of the sum may be reused for accumulation of another component.

In another embodiment of the invention, described in more detail below, the nonzero 4×4 blocks within a block column may be processed column-wise. For example, all first columns of the nonzero blocks in the block column may be processed and the components in corresponding RHS vector registers updated; then all second columns, and so on. When the last columns are processed, the partial sum corresponding to the first nonzero block may be output, and the partial sums corresponding to the other nonzero blocks may each be stored in the RHS vector register corresponding to the previous block row. In this way, the same sequence of RHS vector registers may be used in each block column, and all operations may be performed with a single data vector register. Interleaving instructions involving different RHS vector registers in this way may also prevent delays due to a vector register not yet being available to perform the next SIMD instruction.

Table 1 illustrates exemplary pseudo-code for computing the partial sum $$u_0A^0+u_1A^1+u_2A^2+u_3A^3$$

corresponding to the operations of stencil code matrix-vector multiplication 200 involving block column 0 404 of stencil code matrix 202, where $A^j$ denotes column j of the matrix. As shown, a combination of SIMD multiply (vec_mul) and multiply-add (vec_madd) instructions involving $CR_0$-$CR_3$ 510-516, $DR_0$-$DR_3$ 648-654, and $RR_0$ 702, may be used. As block column 0 404 contains a single nonzero 4×4 block (a copy of block $B_1$ 400), which is the first nonzero block in its block row, the entire partial sum may be accumulated in one RHS vector register, for example, $RR_0$ 702. Vector register $RR_0$ 702, receives the product of coefficient vector register $CR_0$ 510, containing the first column of block $B_1$ 400, with data vector register $DR_0$ 648, containing $u_0$, via a SIMD multiply instruction (Table 1, line 5). The three coefficient vector registers corresponding to the remaining three columns of block $B_1$ 400 are then multiplied with data vector registers $DR_1$-$DR_3$ 650-654, containing $u_1$, $u_2$, $u_3$, and are added to the contents of $RR_0$ 702, via SIMD multiply-add instructions (Table 1, lines 6-8).

TABLE 1

| PSEUDO-CODE | COMMENTS |
|---|---|
| 1 DR0 = vec__splat(u[0]) | The first four data values are |
| 2 DR1 = vec__splat(u[1]) | loaded into four data vector |
| 3 DR2 = vec__splat(u[2]) | registers |
| 4 DR3 = vec__splat(u[3]) | |
| 5 RR0 = vec__mul(CR0, DR0) | [Process block in row 0] |
| 6 RR0 = vec__madd(CR1, DR1, RR0) | RR0 will hold the component of |
| 7 RR0 = vec__madd(CR2, DR2, RR0) | the sum for block row 0 |
| 8 RR0 = vec__madd(CR3, DR3, RR0) | |

As a further example, Table 2 illustrates pseudo-code for computing the partial sum $$u_4 A^4 + u_5 A^5 + u_6 A^6 + u_7 A^7$$

corresponding to the operations of stencil code matrix-vector multiplication 200 involving block column 1 of stencil code matrix 202. The partial sum may be computed via a combination of SIMD multiply (vec_mul) and multiply-add (vec_madd) instructions, involving $CR_0$-$CR_3$ 510-516, $CR_4$-$CR_7$ 526-532, $DR_0$-$DR_3$ 648-654, $RR_0$ 702, and $RR_1$ 704, as shown in Table 2. In this case, the partial sum involves two components, corresponding to the two nonzero 4×4 blocks present in block column 1. As the first nonzero block in block column 1 (a copy of $B_2$ 402), is not the first nonzero block in block row 0 406, the corresponding component of the partial sum in block row 0 406 is added to the first (and only) component of the partial sum from block column 0 404, which is contained in $RR_0$ 702. Coefficient vector register $CR_4$ 526, containing the first column of block $B_2$ 402, is multiplied with data vector register $DR_0$ 648, containing $u_4$, and the product is added to the contents of vector register $RR_0$ 702, via a SIMD multiply-add instruction (Table 2, line 5). The three coefficient vector registers corresponding to the remaining three columns of block $B_2$ 402 are then multiplied with data vector registers $DR_1$-$DR_3$ 650-654, containing $u_5$, $u_6$, $u_7$, and are added to the contents of $RR_0$ 702, via SIMD multiply-add instructions (Table 2, lines 6-8). Since the first block in block column 1 is also the last nonzero block in block row 0 406, calculation of the first component of the above partial sum is complete, so the contents of $RR_0$ 702 may be stored in segment $S_0$ 408 of RHS vector b 212 (Table 2, line 9). The second nonzero block in block column 1, a copy of $B_1$ 400, may processed similarly to the first block in block column 0 (Table 2, lines 10-13). Note that, since processing of the first nonzero block in block column 1 is completed before the second nonzero block in block column 1 is processed, as shown in Table 2, one RHS vector register, for example $RR_0$ 702, could be used for both components of the partial sum. By storing the contents of $RR_1$ 704 in $RR_0$ 702 (Table 2, line 13), the order of the RHS vector registers shown in Table 2 may be maintained, when processing the next block column.

TABLE 2

| PSEUDO-CODE | COMMENTS |
|---|---|
| 1 DR0 = vec__splat(u[4]) | The next four data values are |
| 2 DR1 = vec__splat(u[5]) | loaded into four data |
| 3 DR2 = vec__splat(u[6]) | vector registers |
| 4 DR3 = vec__splat(u[7]) | |
| 5 RR0 = vec__madd(CR4, DR0, RR0) | [Process block in block row 0] |
| 6 RR0 = vec__madd(CR5, DR1, RR0) | RR0 holds the component of |
| 7 RR0 = vec__madd(CR6, DR2, RR0) | the sum for block row 0 |
| 8 RR0 = vec__madd(CR7, DR3, RR0) | |
| 9 store RR0 into b[0, 1, 2, 3] | Last block in block row, so store. The calculation of the first segment of b is now complete |
| 10 RR1 = vec__mul(CR0, DR0) | [Process block in block row 1] |
| 11 RR1 = vec__madd(CR1, DR1, RR1) | Since RR0 has been stored, it |
| 12 RR1 = vec__madd(CR2, DR2, RR1) | is available and could be used |
| 13 RR0 = vec__madd(CR3, DR3, RR1) | for block row 1, instead of RR1 Store in RR0 to set up for next block column |

Note that the data values $u_0$, $u_1$, . . . need only be loaded once. Once a block column is processed, the data values stored in data vector registers $DR_0$-$DR_3$ 648-654 are no longer needed and may be overwritten with the next set of data values. Other intermediate block columns may be processed similarly to block column 1, for example via a loop computation.

In other embodiments of the invention, stencils may have a greater number of stencil coefficients, and vector registers in vector register array 308 (FIG. 3) may have a larger or smaller number of PEs 314 per vector register 312. In this case, additional RHS vector registers, such as $RR_0$ 702 and $RR_1$ 704, may be required. As mentioned above, in certain embodiments, one RHS vector register may be required for each nonzero block in a block column, corresponding to each block row being processed at a given time. However, the total number of RHS vector registers required may be reduced by one if the first nonzero block in a block column is the last block in a block row, and its processing, including storing the associated RHS vector register, is completed before beginning to process the last nonzero block in the block column. In that case the first and last blocks in the block column may use the same RHS vector register.

As mentioned above, in some embodiments the partitioning of stencil code matrix 202 into blocks, as illustrated in FIG. 4A or 4B, may result in a partial last block row or block column. These partial block rows or block columns may be processed similarly to full block rows or block columns. If, for example, the final block column is missing one or more columns, these columns may be excluded from the partial sum for the block column. Similarly, if the final block row is missing one or more rows, then the entries in RHS vector b 212 corresponding to the missing rows are excluded when storing the RHS vector register associated with the final block row. For example, if stencil code matrix 202, representing stencil code with five stencil coefficients 204 applied to 16 data values in data vector u 210, were partitioned into blocks of size 3, corresponding to three PEs per vector register, then one column would remain to be processed after processing all of the full block columns. If, in this scenario, data vector u 210 contained nine data values, then stencil code matrix 202 would have five rows and nine columns, and each block column would have two additional rows.

Figure 8A:
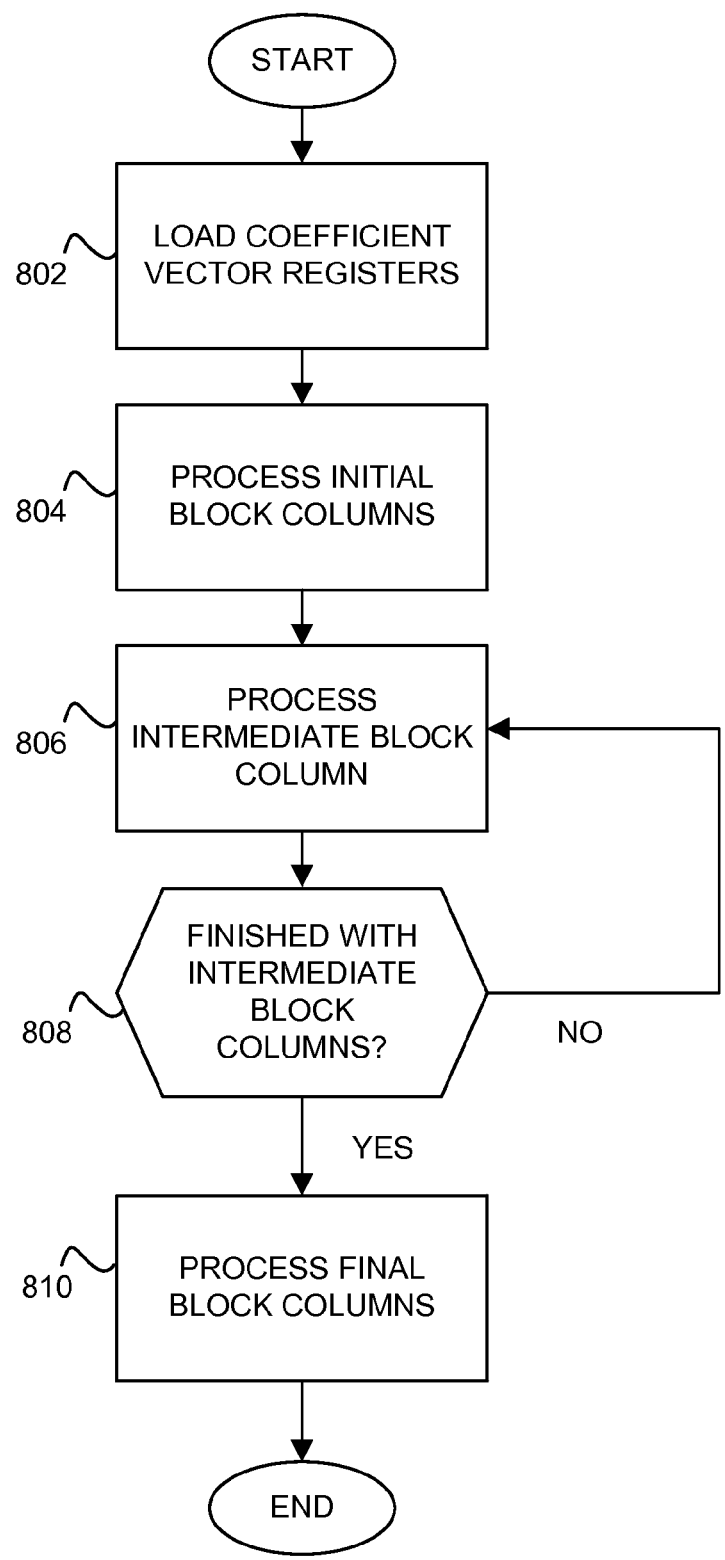
FIGS. 8A and 8B are a flowchart depicting operational steps of a stencil code matrix-vector multiplication in accordance with an embodiment of the present invention.

FIG. 8A is a flowchart depicting operational steps performed by computing device 302 (FIG. 3) in executing a stencil code, for example one represented by stencil code matrix-vector multiplication 200 (FIG. 2), as described in relation to FIGS. 4A and 5, in accordance with an embodiment of the invention. Stencil coefficients are loaded into a set of coefficient vector registers (step 802). For example, stencil coefficients 204 may be loaded into coefficient vector registers 510-516 and 526-532, as illustrated in FIG. 5. As mentioned, several initial block columns, such as block column 0 404, may contain fewer than the maximum number of nonzero blocks. These initial block columns may be handled separately (step 804), while intermediate block columns, each containing a full set of nonzero blocks, may be processed in a loop computation (steps 806 and 808). The processing of individual blocks in these initial block columns is identical to the processing of blocks in an intermediate block column, as described below.

Figure 8B:
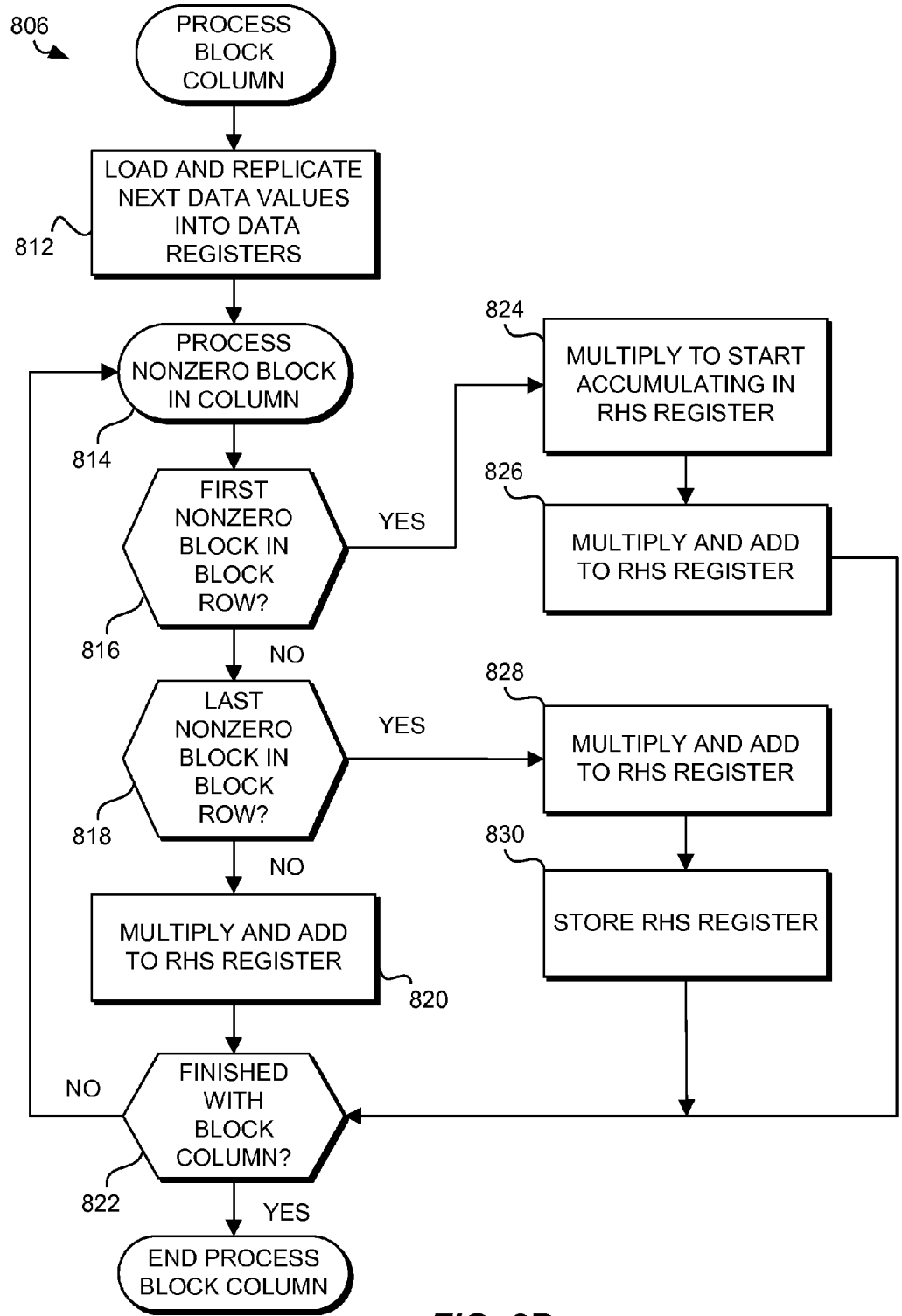

FIG. 8B is a flowchart depicting operational steps performed by computing device 302 in processing an intermediate block column (step 806 of FIG. 8A), as described in relation to FIGS. 4A, 5, 6, and 7, in accordance with embodiments of the invention. Successive data values are loaded into data vector registers, for example data vector registers 648-654, and replicated into their respective PEs (step 812), as illustrated in FIG. 6. This may be accomplished, for example, via SIMD instructions analogous to lines 1-4 of Table 1. In a loop computation, each nonzero block in the block column is processed (step 814). If a nonzero block is the first nonzero block in a block row (decision step 816, "YES" branch), for example $B_1$ 400, accumulation of the corresponding component of the partial sum in an available RHS vector register, for example one of RHS vector registers 702-704, may begin with a SIMD multiply instruction, for example, between the coefficient vector register from 510-516 and 526-532 containing the first column of the block with the first data vector register (step 824). Subsequently, a sequence of SIMD multiply-add instructions between the coefficient vector register from 510-516 and 526-532 containing the remaining columns of the block with the corresponding data vector registers may be added to the contents of the RHS vector register (step 826). If a nonzero block is the last nonzero block in a block row (decision step 818, "YES" branch), for example $B_2$ 402, the corresponding component of the partial sum is accumulated, for example via a sequence of SIMD multiply-add instructions between the coefficient vector register from 510-516 and 526-532 containing a column of the block and the corresponding data vector register from 648-654, into an RHS vector register that has been allocated for the current block row, for example one of 702-704 (step 828). The contents of the RHS vector register are then output (step 830) and the RHS vector register becomes available to accumulate a component of the sum for a subsequent block row. If the nonzero block is neither the first nor the last nonzero block in a block row (decision steps 816, "NO" branch and 818, "NO" branch), a sequence of SIMD multiply-add instructions, as just described, may be used to accumulate the component of the sum into an RHS vector register that has been allocated for the current block row (step 820). If additional nonzero blocks remain to be processed in the current block column (decision step 822, "NO" branch), block column processing continues with another nonzero block (step 814). Otherwise (decision step 822, "YES" branch) intermediate block column processing ends.

Returning to FIG. 8A, several final block columns may contain fewer than the maximum number of nonzero blocks, as mentioned above. These may be handled separately (step 810), in the same manner as in the initial block columns.

Figure 8C:
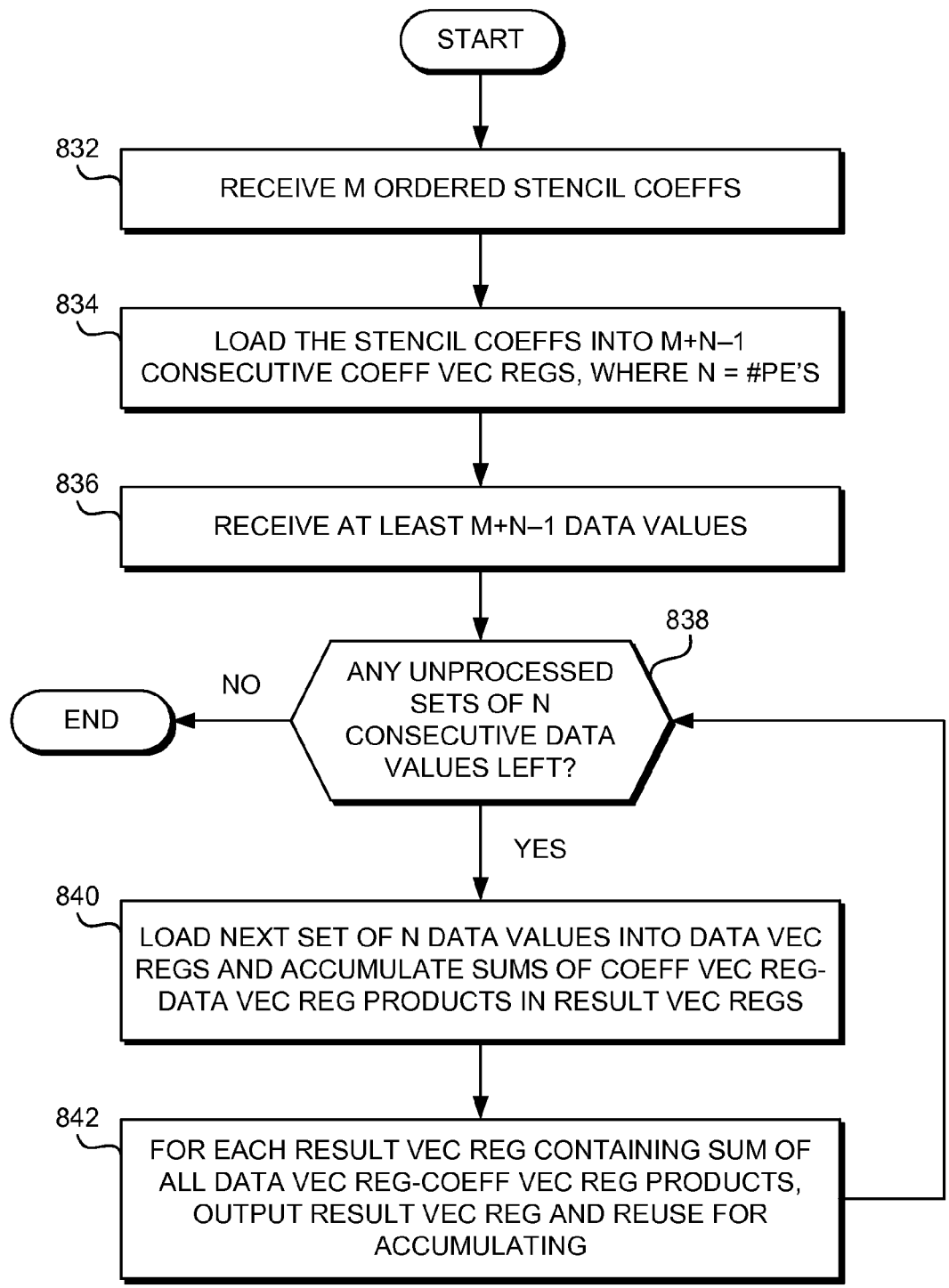
FIGS. 8C, 8D, and 8F are another flowchart depicting operational steps of a stencil code matrix-vector multiplication in accordance with an embodiment of the present invention.

FIG. 8C is a flowchart depicting operational steps performed by computing device 302 (FIG. 3) in executing a general stencil code, in accordance with an embodiment of the invention in which a stencil has M ordered stencil coefficients, and vector registers 312 in vector register array 308 have N PEs 314. A computer processor receives the M ordered stencil coefficients (step 832). The stencil coefficients are loaded into a set of M+N−1 consecutive coefficient vector registers (step 834). In certain embodiments, the consecutive coefficient registers may only be logically consecutive. In other embodiments, the consecutive coefficient registers may be both logically and physically consecutive.

Figure 8D:
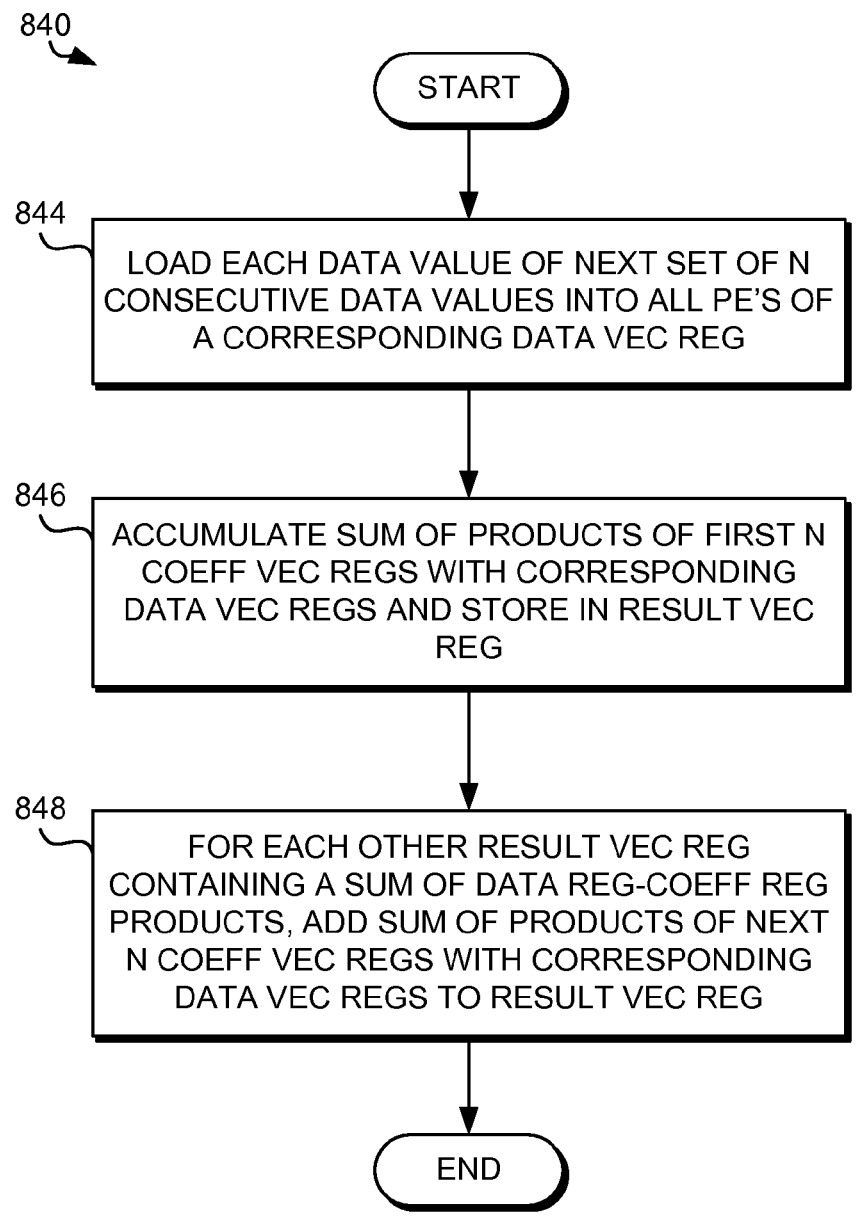
Figure 8E:
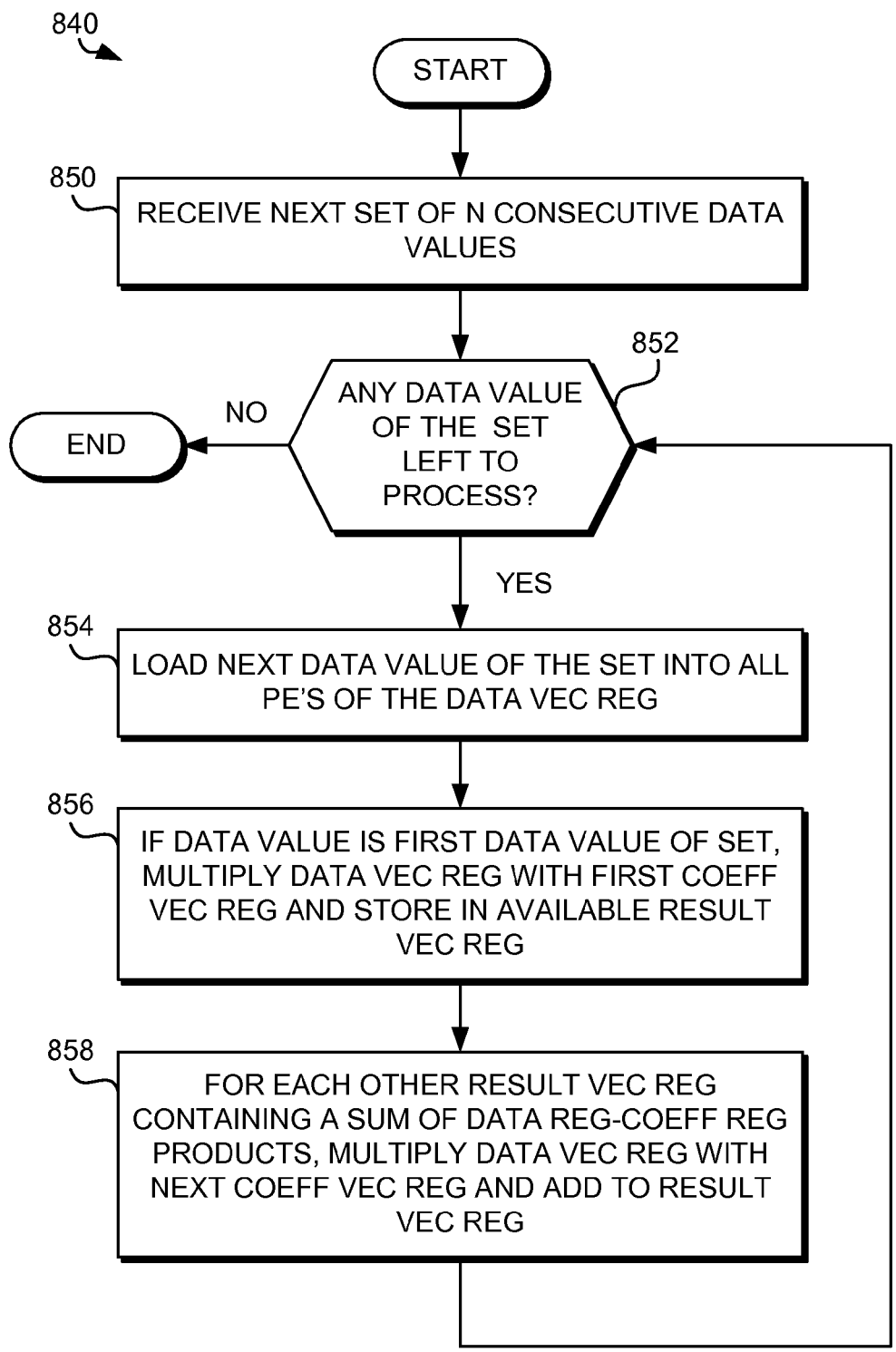
Figure 8F:
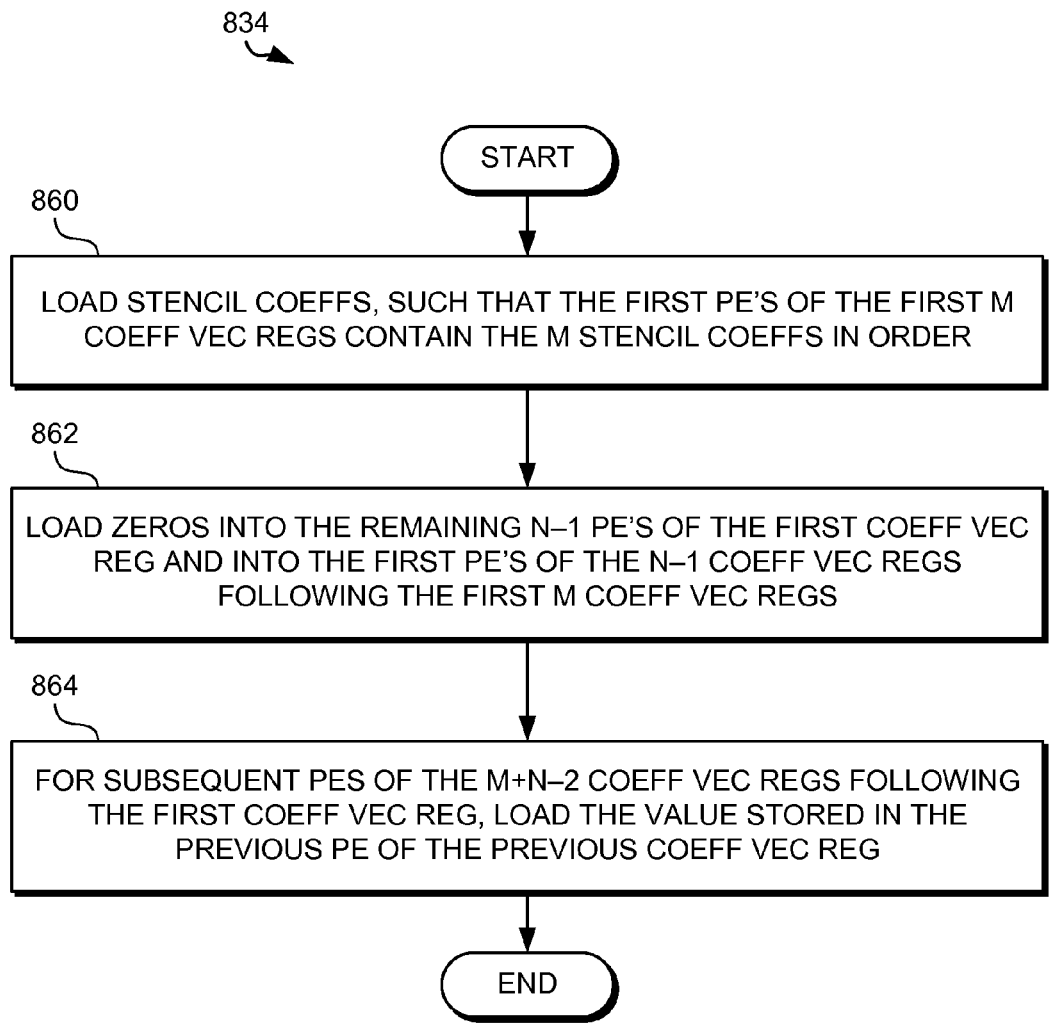

FIG. 8F is a flowchart depicting loading M stencil coefficients into M+N−1 consecutive coefficient vector registers (step 834 of FIG. 8C), in accordance with an embodiment of the invention. The stencil coefficients are loaded, such that the first PEs 314 (FIG. 3) of the first M coefficient vector registers contain the M stencil coefficients in order (step 860). Zeros are loaded into the remaining N−1 PEs of the first coefficient vector register and the first PEs of the N−1 coefficient vector registers following the first M coefficient vector registers (step 862). The subsequent PEs of the M+N−2 coefficient vector registers following the first coefficient vector register receive the value stored in the previous PE of the previous coefficient vector register (step 864).

Returning to FIG. 8C, at least M+N−1 data values are received (step 836). If any unprocessed sets of N consecutive data values remain (decision step 838, "YES" branch), then the next set of N consecutive data values is loaded into data vector registers and sums of products of coefficient vector registers with data vector registers are accumulated in RHS vector registers (step 840).

FIG. 8D is a flowchart depicting step 840 of FIG. 8C, in an embodiment of the invention. A total of [(M−1)/N], the smallest integer not less than (M−1)/N, RHS vector registers, and N data vector registers, may be used. Each data value of the next set of N consecutive data values is loaded into all N PEs of a corresponding data vector register (step 844). A sum of products of the first N coefficient vector registers with corresponding data vector registers is accumulated in an RHS vector register (step 846), where the RHS vector register selected is one that is not currently being used for accumulating. To each other RHS vector register containing a sum of products of a data vector register with a coefficient vector register, a sum of the N coefficient vector registers, following the ones used in the sum, with corresponding data vector registers is added (step 848).

Returning to FIG. 8C, for each RHS vector register containing a sum of all products of the M+N−1 coefficient vector registers with corresponding data vector registers, output the contents of the RHS vector register, and reuse the RHS vector register for accumulating (step 842). If no sets of N consecutive data values remain to be processed (decision step 838, "NO" branch), processing ends.

FIG. 8E is a flowchart depicting step 840 of FIG. 8C, in another embodiment of the invention. A single data vector register and a total of [(M+N−1)/N], the smallest integer not less than (M+N−1)/N, RHS vector registers may be used. The next set of N consecutive data values is received (step 850). The N data values are processed. If no data value of the set of data values remains to be processed (decision step 852, "NO" branch), processing continues at step 842 of FIG. 8C. If any data value of the set of data values remains to be processed (decision step 852, "YES" branch), the next data value is loaded into all N PEs of the data vector register (step 854). If the data value is the first data value of the set, the data vector register is multiplied with the first coefficient vector register of the M+N−1 consecutive coefficient vector registers, and the result is stored in an RHS vector register (step 856). The RHS vector register selected is one that is not currently being used for accumulating. For each other RHS vector register containing a sum of products of the data vector register with a coefficient vector register, the data vector register is multiplied with the coefficient vector register following the ones used in the sum, and the product is added to the sum (step 858). Processing continues at decision step 852.

Returning to FIG. 8C, for each RHS vector register containing a sum of all products of the M+N−1 coefficient vector registers with corresponding data vector registers, output the contents of the RHS vector register, and reuse the RHS vector register for accumulating (step 842). If no sets of N consecutive data values remain to be processed (decision step 838, "NO" branch), processing ends.

As mentioned above, stencil codes of higher dimension, for example 2D or 3D stencil codes, may be implemented by performing several 1D stencil operations for each higher-dimensional stencil operation and combining the results.

Figure 9:
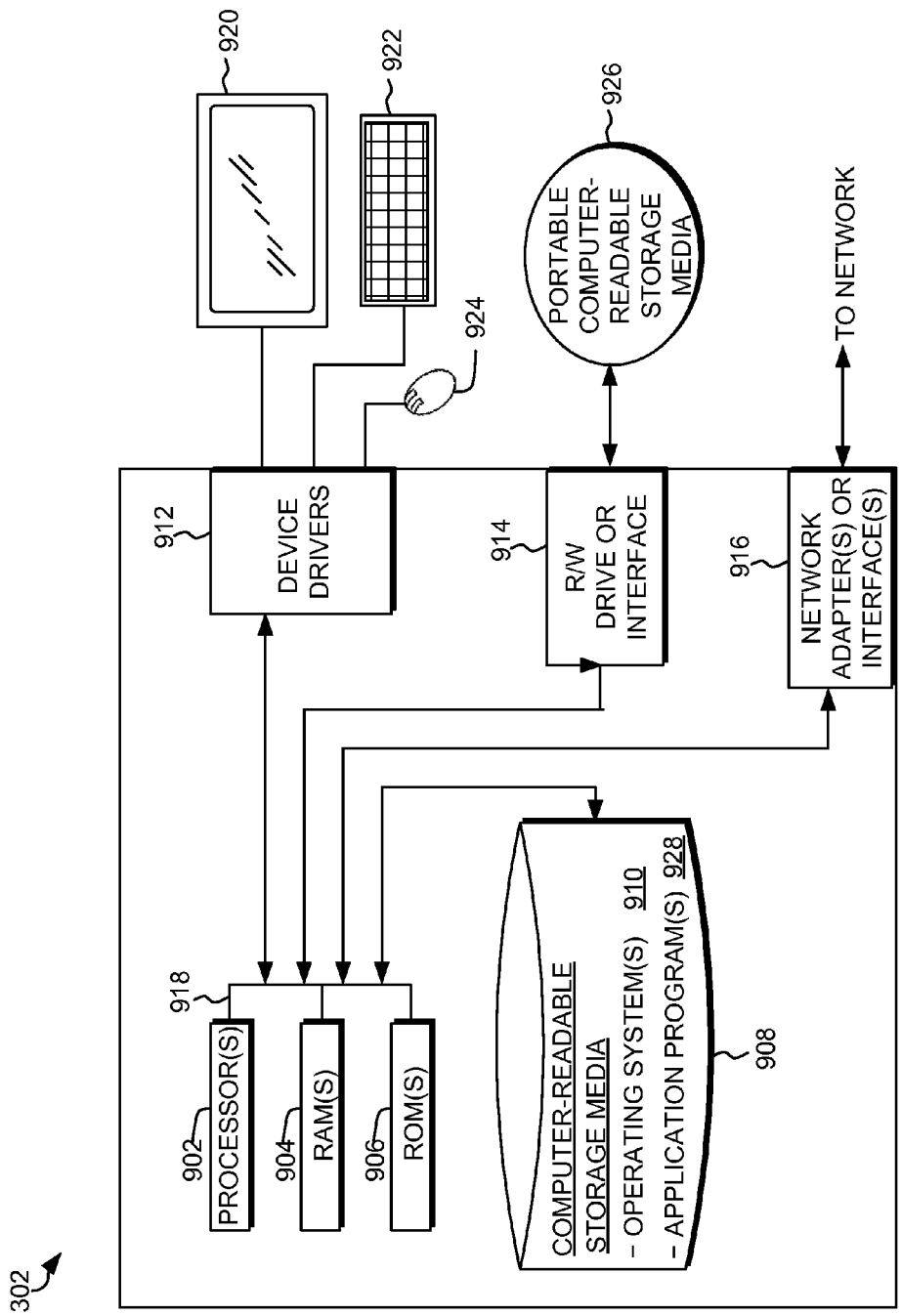
FIG. 9 is a functional block diagram illustrating a data processing environment, in accordance with an embodiment of the present invention.

FIG. 9 depicts a block diagram of components of a computing device 302 of FIG. 3, in accordance with an embodiment of the present invention. It should be appreciated that FIG. 9 provides only an illustration of one implementation and does not imply any limitations with regard to the environments in which different embodiments may be implemented. Many modifications to the depicted environment may be made.

Computing device 302 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 928, for example, a program implementing a stencil code, are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device 302 may also include a R/W drive or interface 914 to read from and write to one or more portable computer readable storage media 926. Application programs 928 on computing device 302 may be stored on one or more of the portable computer readable storage media 926, read via the respective R/W drive or interface 914 and loaded into the respective computer readable storage media 908.

Computing device 302 may also include a network adapter or interface 916, such as a TCP/IP adapter card or wireless communication adapter (such as a 4G wireless communication adapter using OFDMA technology). Application programs 928 on computing device 302 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

Computing device 302 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing description of various embodiments of the present invention has been presented for purposes of illustration and description. It is not intended to be exhaustive nor to limit the invention to the precise form disclosed. Many modifications and variations are possible. Such modification and variations that may be apparent to a person skilled in the art of the invention are intended to be included within the scope of the invention as defined by the accompanying claims.

What is claimed is:

1. A method for implementing a 1D stencil code via SIMD instructions on a computer that includes a plurality of vector registers, each having a number N of processing elements (PEs), the plurality of vector registers including a set of vector registers used to store stencil coefficients, a set of vector registers used to store data values, and a set of vector registers used to store results, the method comprising:
   receiving, by a processor, a number M of ordered stencil coefficients;
   simultaneously loading, by the processor, stencil coefficients into M+N−1 consecutive coefficient vector registers of the set of coefficient vector registers, such that:
      the first PEs of the first M coefficient vector registers contain the M stencil coefficients in order, and the remaining N−1 PEs of the first coefficient vector register and the first PEs of N−1 coefficient vector registers following the first M coefficient vector registers contain zeros;
      the subsequent PEs of M+N−2 coefficient vector registers following the first coefficient vector register contain the value stored in a previous PE of a previous coefficient vector register;
   receiving, by the processor, at least M+N−1 data values;
   processing consecutive sets of N consecutive data values of the received data values by:
      simultaneously loading, by the processor, each data value of the set of N consecutive data values into all PEs of a data vector register of the set of data vector registers;
      simultaneously multiplying, by the processor, the stencil coefficients in the PEs of consecutive coefficient vector registers with the consecutive data values in the PEs of data vector registers containing the consecutive data values to produce a plurality of products;
      simultaneously accumulating, by the processor, the plurality of products in corresponding PEs of a result vector register of the set of result vector registers; and
      outputting, by the processor, the contents of each result vector register containing a sum of the products of all the coefficient vector registers with a data vector register, wherein each result vector register containing a sum of all the products of all the coefficient vector registers with a corresponding data vector register is then reused for accumulating.

2. The method, in accordance to claim 1, wherein the set of vector registers used to store data values consists of N vector registers, and wherein simultaneously loading, by the processor, each data value of the set of N consecutive data values comprises:
simultaneously loading, by the processor, each consecutive data value of the set into all PEs of a corresponding data vector register of the set of N data vector registers; and wherein simultaneously accumulating, by the processor, comprises:
simultaneously accumulating, by the processor, in corresponding PEs of a result vector register of the set of result vector registers a sum of products of the stencil coefficients in the PEs of coefficient vector registers in a first group of N consecutive coefficient vector registers with the consecutive data values in the PEs of corresponding data vector registers; and
to each other result vector register containing an accumulated sum of products of groups of N coefficient vector registers with corresponding data vector registers, adding, by a processor, a sum of products of a following group of N coefficient vector registers with corresponding data vector registers.

3. The method, in accordance to claim 1, wherein the set of vector registers used to store data values consists of one vector register, and wherein simultaneously loading, by the processor, each data value of the set of N consecutive data values comprises:
simultaneously loading, by the processor, each data value of the set of N consecutive data values into all PEs of the data vector register; and wherein simultaneously accumulating, by the processor, comprises:
determining if a data value loaded into the PEs of a data vector register is the first data value of the set;
in response to determining that the data value loaded into the PEs of a data vector register is the first data value of the set, simultaneously storing, by the processor, in the corresponding PEs of a result vector register of the set of result vector registers not containing a sum of products of consecutive coefficient vector registers with the data vector register, an initial product, of a sum of products, of the first coefficient vector register of the M+N−1 consecutive coefficient vector registers with the data vector register; and
adding, by the processor, to the corresponding PEs of every other result vector register of the set of result vector registers containing an accumulated sum of products of consecutive coefficient vector registers with the data vector register, a product of the next consecutive coefficient vector register of the M+N−1 consecutive coefficient vector registers with the data vector register.

4. The method, in accordance to claim 1, further comprising:
determining if a set of fewer than N consecutive data values remain after all consecutive sets of N consecutive data values have been processed;
in response to determining that the set of fewer than N consecutive data values remain after all consecutive sets of N consecutive data values have been processed:
simultaneously loading, by the processor, each data value of the set of fewer than N consecutive data values into all PEs of a data vector register of the set of data vector registers;
simultaneously multiplying, by the processor, the stencil coefficients in the PEs of consecutive coefficient vector registers with the consecutive data values in the PEs of data vector registers containing the fewer than N consecutive data values to produce a plurality of products;
simultaneously accumulating, by the processor, the plurality of products in corresponding PEs of a result vector register of the set of result vector registers; and
outputting, by the processor, the contents of each result vector register containing a sum of the products of all the coefficient vector registers with a data vector register.

5. The method, in accordance to claim 4, wherein loading, by the processor, each data value of the set of fewer than N consecutive data values comprises:
simultaneously loading, by the processor, each consecutive data value of the set of fewer than N consecutive data values into all PEs of a corresponding data vector register of the set of data vector registers, and wherein
simultaneously accumulating, by the processor, comprises:
adding, by a processor, to a result vector register containing an accumulated sum of products of groups of N coefficient vector registers with corresponding data vector registers, a sum of products of a following group of fewer than N coefficient vector registers with corresponding data vector registers.

6. The method, in accordance to claim 4, wherein the set of vector registers used to store data values consists of one vector register, and
wherein simultaneously loading, by the processor, each data value of the set of fewer than N consecutive data values comprises:
simultaneously loading, by the processor, each data value of the set of fewer than N consecutive data values into all PEs of the data vector register; and
wherein simultaneously accumulating, by the processor, comprises:
adding, by the processor, to a result vector register of the set of result vector registers containing an accumulated sum of products of consecutive coefficient vector registers with the data vector register, a product of the next consecutive coefficient vector register of the M+N−1 consecutive coefficient vector registers with the data vector register.

7. A computer program product for implementing a 1D stencil code via SIMD instructions on a computer that includes a plurality of vector registers, each having a number N of processing elements (PEs), the plurality of vector registers including a set of vector registers used to store stencil coefficients, a set of vector registers used to store data values, and a set of vector registers used to store results, the computer program product comprising:

one or more computer-readable storage media and program instructions stored on the one or more computer-readable storage media, the program instructions comprising:
   program instructions to receive a number M of ordered stencil coefficients;
   program instructions to simultaneously load stencil coefficients into M+N−1 consecutive coefficient vector registers of the set of coefficient vector registers, such that:
      the first PEs of the first M coefficient vector registers contain the M stencil coefficients in order, and the remaining N−1 PEs of the first coefficient vector register and the first PEs of N−1 coefficient vector registers following the first M coefficient vector registers contain zeros;
      the subsequent PEs of M+N−2 coefficient vector registers following the first coefficient vector register contain the value stored in a previous PE of a previous coefficient vector register;
   program instructions to receive at least M+N−1 data values;
   program instructions to process consecutive sets of N consecutive data values of the received data values by:
      program instructions to simultaneously load each data value of the set of N consecutive data values into all PEs of a data vector register of the set of data vector registers;
      program instructions to simultaneously multiply, by the processor, the stencil coefficients in the PEs of consecutive coefficient vector registers with the consecutive data values in the PEs of data vector registers containing the consecutive data values to produce a plurality of products;
      program instructions to simultaneously accumulate, by the processor, the plurality of products in corresponding PEs of a result vector register of the set of result vector registers; and
      program instructions to output the contents of each result vector register containing a sum of the products of all the coefficient vector registers with a data vector register, wherein each result vector register containing a sum of all the products of all the coefficient vector registers with a corresponding data vector registers is then reused for accumulating.

8. The computer program product, in accordance to claim 7, wherein the set of vector registers used to store data values consists of N vector registers, and wherein program instructions to simultaneously load each data value of the set of N consecutive data values comprises:
   program instructions to simultaneously load each consecutive data value of the set into all PEs of a corresponding data vector register of the set of N data vector registers; and
   wherein program instructions to simultaneously accumulate comprises:
      program instructions to simultaneously accumulate in corresponding PEs of a result vector register of the set of result vector registers a sum of products of the stencil coefficients in the PEs of coefficient vector registers in a first group of N consecutive coefficient vector registers with the consecutive data values in the PEs of corresponding data vector registers; and
      to each other result vector register containing an accumulated sum of products of groups of N coefficient vector registers with corresponding data vector registers, program instructions to add a sum of products of a following group of N coefficient vector registers with corresponding data vector registers.

9. The computer program product, in accordance to claim 7, wherein the set of vector registers used to store data values consists of one vector register, and
   wherein program instructions to simultaneously load each data value of the set of N consecutive data values comprises:
      program instructions to simultaneously load each data value of the set of N consecutive data values into all PEs of the data vector register; and
   wherein program instructions to simultaneously accumulate comprises:
      program instructions for determining if a data value loaded into the PEs of a data vector register is the first data value of the set;
      program instructions, in response to determining that the data value loaded into PEs of a the data vector register is the first data value of the set, to simultaneously store in the corresponding PEs of a result vector register of the set of result vector registers not containing a sum of products of consecutive coefficient vector registers with the data vector register, an initial product, of a sum of products, of the first coefficient vector register of the M+N−1 consecutive coefficient vector registers with the data vector register; and
      program instructions to add to the corresponding PEs of every other result vector register of the set of result vector registers containing an accumulated sum of products of consecutive coefficient vector registers with the data vector register, a product of the next consecutive coefficient vector register of the M+N−1 consecutive coefficient vector registers with the data vector register.

10. The computer program product, in accordance to claim 7, further comprising:
   program instructions for determining if a set of fewer than N consecutive data values remain after all consecutive sets of N consecutive data values have been processed;
   program instructions, in response to determining that the set of fewer than N consecutive data values remain after all consecutive sets of N consecutive data values have been processed, to:
      simultaneously load each data value of the set of fewer than N consecutive data values into all PEs of a data vector register of the set of data vector registers;
      simultaneously multiply, by the processor, the stencil coefficients in the PEs of consecutive coefficient vector registers with the consecutive data values in the PEs of data vector registers containing the fewer than N consecutive data values to produce a plurality of products;
      simultaneously accumulate, by the processor, the plurality of products in corresponding PEs of a result vector register of the set of result vector registers; and
      output the contents of each result vector register containing a sum of the products of all the coefficient vector registers with a data vector register.

11. The computer program product, in accordance to claim 10, wherein program instructions to load each data value of the set of fewer than N consecutive data values comprises:
 program instructions to simultaneously load by the processor, each consecutive data value of the set of fewer than N consecutive data values into all PEs of a corresponding data vector register of the set of data vector registers, and
 wherein program instructions to accumulate comprises:
  program instructions to simultaneously add to a result vector register containing an accumulated sum of products of groups of N coefficient vector registers with corresponding data vector registers, a sum of products of a following group of fewer than N coefficient vector registers with corresponding data vector registers.

12. The computer program product, in accordance to claim 10, wherein the set of vector registers used to store data values consists of one vector register, and
 wherein program instructions to simultaneously load each data value of the set of fewer than N consecutive data values comprises:
  program instructions to simultaneously load each data value of the set of fewer than N consecutive data values into all PEs of the data vector register; and
 wherein program instructions to simultaneously accumulate comprises:
  program instructions to add to a result vector register of the set of result vector registers containing an accumulated sum of products of consecutive coefficient vector registers with the data vector register, a product of the next consecutive coefficient vector register of the M+N−1 consecutive coefficient vector registers with the data vector register.

13. A computer system for implementing a 1D stencil code via SIMD instructions on a computer that includes a plurality of vector registers, each having a number N of processing elements (PEs), the plurality of vector registers including a set of vector registers used to store stencil coefficients, a set of vector registers used to store data values, and a set of vector registers used to store results, the computer system comprising:
 one or more computer processors, one or more computer-readable storage media, and program instructions stored on one or more of the computer-readable storage media for execution by at least one of the one or more processors, the program instructions comprising:
 program instructions to receive a number M of ordered stencil coefficients;
 program instructions to simultaneously load stencil coefficients into M+N−1 consecutive coefficient vector registers of the set of coefficient vector registers, such that:
  the first PEs of the first M coefficient vector registers contain the M stencil coefficients in order, and the remaining N−1 PEs of the first coefficient vector register and the first PEs of N−1 coefficient vector registers following the first M coefficient vector registers contain zeros;
  the subsequent PEs of M+N−2 coefficient vector registers following the first coefficient vector register contain the value stored in a previous PE of a previous coefficient vector register;
 program instructions to receive at least M+N−1 data values;
 program instructions to process consecutive sets of N consecutive data values of the received data values by:
  program instructions to simultaneously load each data value of the set of N consecutive data values into all PEs of a data vector register of the set of data vector registers;
  program instructions to simultaneously multiply, by the processor, the stencil coefficients in the PEs of consecutive coefficient vector registers with the consecutive data values in the PEs of data vector registers containing the consecutive data values to produce a plurality of products;
  program instructions to simultaneously accumulate, by the processor, the plurality of products in corresponding PEs of a result vector register of the set of result vector registers; and
  program instructions to output the contents of each result vector register containing a sum of the products of all the coefficient vector registers with a data vector register, wherein each result vector register containing a sum of all the products of all the coefficient vector registers with a corresponding data vector registers is then reused for accumulating.

14. The computer system, in accordance to claim 13, wherein the set of vector registers used to store data values consists of N vector registers, and
 wherein program instructions to simultaneously load each data value of the set of N consecutive data values comprises:
  program instructions to simultaneously load each consecutive data value of the set into all PEs of a corresponding data vector register of the set of N data vector registers; and
 wherein program instructions to simultaneously accumulate comprises:
  program instructions to simultaneously accumulate in corresponding PEs of a result vector register of the set of result vector registers a sum of products of the stencil coefficients in the PEs of coefficient vector registers in a first group of N consecutive coefficient vector registers with the consecutive data values in the PEs of corresponding data vector registers; and
  to each other result vector register containing an accumulated sum of products of groups of N coefficient vector registers with corresponding data vector registers, program instructions to add a sum of products of a following group of N coefficient vector registers with corresponding data vector registers.

15. The computer system, in accordance to claim 13, wherein the set of vector registers used to store data values consists of one vector register, and
 wherein program instructions to simultaneously load each data value of the set of N consecutive data values comprises:
  program instructions to simultaneously load each data value of the set of N consecutive data values into all PEs of the data vector register; and
 wherein program instructions to simultaneously accumulate comprises:
  program instructions for determining if a data value loaded into the PEs of a data vector register is the first data value of the set;
  program instructions, in response to determining that the data value loaded into PEs of a the data vector register is the first data value of the set, to simultaneously store in the corresponding PEs of a result vector register of the set of result vector registers not containing a sum of products of consecutive coefficient vector registers with the data vector register, an initial product, of a sum of products, of the first coefficient vector register of the M+N−1 consecutive coefficient vector registers with the data vector register; and program instructions to add to the corresponding PEs of every other result vector register of the set of result vector registers containing an accumulated sum of products of consecutive coefficient vector registers with the data vector register, a product of the next consecutive coefficient vector register of the M+N−1 consecutive coefficient vector registers with the data vector register.

16. The computer system, in accordance to claim 13, further comprising:

program instructions for determining if a set of fewer than N consecutive data values remain after all consecutive sets of N consecutive data values have been processed;

program instructions, in response to determining that the set of fewer than N consecutive data values remain after all consecutive sets of N consecutive data values have been processed, to:

simultaneously load each data value of the set of fewer than N consecutive data values into all PEs of a data vector register of the set of data vector registers;

simultaneously multiply, by the processor, the stencil coefficients in the PEs of consecutive coefficient vector registers with the consecutive data values in the PEs of data vector registers containing the fewer than N consecutive data values to produce a plurality of products;

simultaneously accumulate, by the processor, the plurality of products in corresponding PEs of a result vector register of the set of result vector registers; and output the contents of each result vector register containing a sum of the products of all the coefficient vector registers with a data vector register.

17. The computer system, in accordance to claim 16, wherein program instructions to load each data value of the set of fewer than N consecutive data values comprises:

program instructions to simultaneously load by the processor, each consecutive data value of the set of fewer than N consecutive data values into all PEs of a corresponding data vector register of the set of data vector registers, and wherein program instructions to accumulate comprises:

program instructions to simultaneously add to a result vector register containing an accumulated sum of products of groups of N coefficient vector registers with corresponding data vector registers, a sum of products of a following group of fewer than N coefficient vector registers with corresponding data vector registers.

18. The computer system, in accordance to claim 16, wherein the set of vector registers used to store data values consists of one vector register, and wherein program instructions to simultaneously load each data value of the set of fewer than N consecutive data values comprises:

program instructions to simultaneously load each data value of the set of fewer than N consecutive data values into all PEs of the data vector register; and wherein program instructions to simultaneously accumulate comprises:

program instructions to add to a result vector register of the set of result vector registers containing an accumulated sum of products of consecutive coefficient vector registers with the data vector register, a product of the next consecutive coefficient vector register of the M+N−1 consecutive coefficient vector registers with the data vector register.

\* \* \* \* \*